United States Patent
Clark et al.

[15] 3,668,203
[45] June 6, 1972

[54] CEPHALOSPORIUS HAVING A THIOLTHERIFIED METHYL GROUP IN THE 3-POSITION

[72] Inventors: John Colin Clark, Gerrards Cross, England; James Kennedy, Montrose, Angus, Scotland; Alan Gibson Long, Greenford, England

[73] Assignee: Glaxo Laboratories Limited, Greenford, Middlesex, England

[22] Filed: June 13, 1969

[21] Appl. No.: 833,150

Related U.S. Application Data

[63] Continuation-in-part of Ser. No. 752,190, Aug. 13, 1968, abandoned.

[30] Foreign Application Priority Data

June 14, 1968 Great Britain.....................28,527/68

[52] U.S. Cl. ..........................................260/243 C, 424/246
[51] Int. Cl. ............................................................C07d 99/24
[58] Field of Search ..............................................260/243 C

[56] References Cited

UNITED STATES PATENTS 3,243,435   3/1966   Cowley et al......................260/243 C

*Primary Examiner*—Nicholas S. Rizzo
*Attorney*—Bacon & Thomas

[57] ABSTRACT

7β-acylamidoceph-3-em-4-carboxylic acids having a thioetherified methyl group at the 3-position and physiologically acceptable derivatives thereof. The compounds have utility as antibiotics and show significant absorption after oral administration.

11 Claims, No Drawings

CEPHALOSPORIUS HAVING A THIOLTHERIFIED METHYL GROUP IN THE 3-POSITION

This application is a continuation-in-part of our application Ser. No. 752,190 filed Aug. 13, 1968, now abandoned, and is concerned with cephalosporin compounds having antibacterial activity.

The cephalosporin compounds referred to in this specification are generally named with reference to cepham (see J.A.C.S. 1962, 84, 3400 and J.Chem. Soc. 1965, 5031). The term "cephem" refers to the basic cepham structure with a single double bond.

Cephalosporin antibiotics are of great interest in that a number of them are of value in the treatment of infections caused by a variety of gram-positive and gram-negative pathogenic bacteria. Additionally these antibiotics are of value in that they can be administered to penicillin hypersensitive patients. To date most cephalosporin antibiotics which have significant antibacterial activity require to be administered by injection. These antibiotics usually have a substituent in the 3-position which is either an acetoxymethyl or pyridiniummethyl group.

We have now found that certain cephalosporin compounds having a thioetherified methyl group at the 3-position show significant absorption after oral administration as evidenced by the level of the urinary recovery of the antibiotic following oral administration to rats. Moreover, cephalosporin compounds possessing 3-thioetherified methyl groups appear to be more resistant to metabolic processes reducing antibacterial activity than do cephalosporin compounds possessing 3-acetoxymethyl groups, as evidenced by animal tests. Cephalosporin antibiotics having 3-pyridiniummethyl groups are in general not well absorbed after oral administration.

According to the invention we provide compounds of the general formula

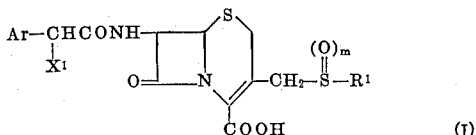

where Ar is an aromatic group, e.g. phenyl or phenyl substituted with halo, hydroxy, lower alkyl, nitro, amino, lower alkanoyl, lower alkoxy or lower alkylmercapto, or a heterocyclic group, e.g., thien-2-yl or thien-3-yl; $X^1$ is amino; substituted amino, e.g., acylamido; hydroxy; formyloxy or lower alkanoyloxy; $m$ is 0 or 1 and $R^1$ is a lower alkyl group, i.e., a $C_{1-4}$ alkyl group; and non-toxic derivatives thereof, e.g., base salts (where applicable) and acid addition salts (where applicable) and compounds obtained by reacting an amino group and/or acylamido group(s) of the 7-side chain with an aldehyde or ketone e.g. acetone or methyl ethyl ketone. By the term "non-toxic" as applied to the compounds of the invention we mean those derivatives which are physiologically acceptable in the dosage at which they are administered.

Of particular interest are the compounds of the formula (I) wherein the acid Ar CH($X^1$)COOH is of the D-series.

$R^1$ may thus be methyl, ethyl, propyl, isopropyl, n-butyl etc.

An important series of compounds according to the invention are the 7β1-(α-aminophenylacetamido)-3-lower-alkylthiomethylceph-3-em-4-carboxylic acids viz, the compounds having the general formula:

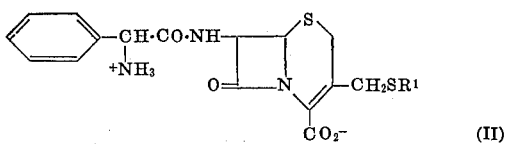

where $R^1$ has the above defined meaning and acid addition and base salts thereof.

A particularly important compound of the general formula (II) is 7β-(α-aminophenylacetamido)-3-methylthiomethylceph-3-em-4-carboxylic acid of the formula:

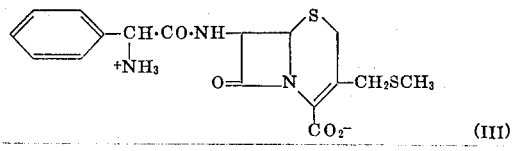

An important series of compounds related to those of formulas (II) and (III) are compounds of the formula:

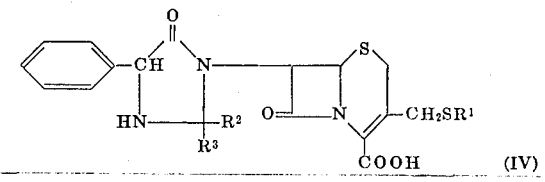

where $R^1$ has the above defined meanings and $R^2$ and $R^3$ which may be the same or different are lower alkyl groups ($C_1 - C_4$), particularly methyl or ethyl, and base salts thereof.

The compounds according to the invention or salts thereof, may be used as a mixture of diastereoisomers or in one of the pure diastereoisomeric forms. The derivatives of D(-) phenylglycine and the salts of those derivatives are especially preferred.

7β-(D-α-Aminophenylacetamido)-3-methylthiomethyl-ceph-3-em-4-carboxylic acid is a broad-spectrum antibiotic being active against gram-positive and gram-negative organisms as evidenced by in vitro tests. It is substantially resistant to degradation in vivo as evidenced by animal tests. A particularly significant property of this compound is that, when given by the oral route, it is well absorbed and gives good blood levels. It has an appreciable level of activity on oral administration. It will be appreciated that the property of absorption by the subject after oral administration is highly desirable.

Salts which may be formed from the compounds according to the invention include (a) inorganic base salts such as alkali metal, e.g., sodium and potassium, alkaline earth, e.g., calcium, and organic base salts, e.g., procaine and dibenzylethylene diamine salts and (b) acid addition salts, e.g., with hydrochloric, hydrobromic, sulphuric, nitric, phosphoric, toluene-p-sulphonic and methane sulphonic acids. The salts may also be in the form of resinates, formed, e.g., with a polystyrene resin containing amino, quaternary amino, or sulphonic acid groups, or a resin containing carboxyl groups, e.g., a polyacrylic acid resin. The resin may if desired be cross-linked, e.g., it may be a copolymer of styrene and divinylbenzene containing the appropriate groups.

The compounds according to the invention are referred to herein generically as thioether compounds and this term is to be taken as including the —S— and $$-\overset{\overset{\displaystyle O}{\|}}{S}-$$

compounds except where the context is clearly with reference to the simple —S— ethers.

The thioether compounds according to the invention may be prepared by acylation of a 7β-amino-3-thioetherified methylceph-3-em-4-carboxylic acid or derivative thereof or alternatively be conversion (direct or indirect) of a 7β-acylamido-3-hydroxymethyl (or 3-acetoxymethyl)-ceph-3-em-4-carboxylic acid or derivative thereof into a 3-thioetherified methyl compound. Both methods have advantages and will now be described in more detail.

ACYLATION OF 7β-AMINO-3-THIOETHERIFIED METHYLCEPH-3-EM-4-CARBOXYLIC ACID AND THEIR ESTERS

The acylation may be effected with any convenient acylation agent such as for example, an acid halide (e.g., chloride of bromide), an anhydride or mixed anhydride, e.g., with pivalic acid or formed with a haloformate, e.g., a lower alkylhaloformate, or an active ester or azide; alternatively, the acid itself can be used, together with an esterifying agent, e.g., carbonyldiimidazole or a carbodiimide such as N,N'-diethyl-, -dipropyl-, or -diisopropylcarbodiimide, or preferably N,N'-dicyclohexylcarbodiimide.

The cephalosporin compound may be employed as the free 4-COOH compound, or as an ester with an alcohol or phenol which may readily be split off, e.g., by hydrolysis or reduction, at a later stage of the reaction, or as an acid addition salt, e.g., with nitric acid or a hydrocarbyl sulphonic acid, of the free 4-COOH compound or ester thereof. Examples of hydrocarbyl sulphonic acids include alkylbenzene sulphonic acids, e.g., p-toluene sulphonic acid, and lower alkane sulphonic acids, e.g., methane sulphonic acid.

Alcohol and phenol residues which may readily be split off include those containing electron-attracting substituents for example sulpho groups and esterified carboxyl groups. These groups may be split off by alkaline reagents but care should be exercised in using these reagents not to cause $\Delta^3 \rightarrow \Delta^2$ isomerization. Benzyl ester groups at the 4-position may be removed by hydrogenolysis although this may involve catalyst poisoning. A preferred method involves acid hydrolysis and groups which may be removed by acid hydrolysis include the adamantyl group, t-butyl and the residues of alkanols containing electron donors such as acyloxy, alkoxy, benzoyloxy, substituted benzoyloxy, halogen, alkylthio, phenyl, alkoxyphenyl or aromatic heterocyclic in the α-position. These radicals may be derived from alcohols such as p-methoxybenzyl alcohol, furfuryl alcohol, di-p-methoxyphenylmethanol, triphenylmethanol, diphenylmethanol and benzoyloxymethanol. We particularly prefer to use compounds having inter alia a diphenylmethoxycarbonyl or p-methoxybenzoyloxycarbonyl group at the 4-position; esters of this type do not appear to undergo appreciable $\Delta^3 \rightarrow \Delta^2$ isomerization under the conditions of reaction.

Alcohol residues which may be readily split off by a reducing agent are those of a 2,2,2-trihalogenoethanol, e.g., 2,2,2-trichloroethanol. These residues may be removed by zinc/acetic acid, zinc/formic acid, zinc/lower alcohol or zinc/pyridine.

Where the ester group at the 4-position is removed by acid hydrolysis, this may be effected by using trifluoroacetic acid preferably in conjunction with anisole or alternatively by using hydrochloric acid in admixture with acetic acid.

Other ester groups at the 4-position which can readily be removed include silyl and stannyl esters.

Stannyl esters are formed with tetravalent tin moieties, and the stannylating agent conveniently has the formula $R^9_3SnOSnR^9_3$, $R^9_3SnOH$, $R^9_3SnOCOR^9$, $R^9_3SnOR^9$, $SnR^9_4$, or $Sn(OR^9)_4$ where $R^9$ represents a hydrocarbon group, e.g., a lower alkyl, aryl, or aralkyl group. Tri-n-butyltin oxide is particularly preferred owing to its ready availability and low toxicity; triethyltin hydroxide is also particularly useful. Triloweralkyl tin halides, e.g., tributyltin chloride, may be reacted with an alkali metal, e.g., sodium, salt of a cephalosporanic acid to provide the required stannyl ester.

Stilyl esters are formed with tetravalent silicon moieties, and the silylating agent conveniently is a silazane of the formula $R^4_3Si\cdot NR^4_2$, $R^4_3Si\cdot NH\cdot SiR^4_3$, $R^4_3Si\cdot NH\cdot COR^4$, $R^4_3Si\cdot NH\cdot CO\cdot NH\cdot SiR^4_3$, $R^4NH\cdot CO\cdot NR^4\cdot SiR^4_3$, or $R^4C(OSiR^4_3):NSiR^4_3$ where the various groups $R^4$, which can be the same or different, represent hydrogen atoms or alkyl, aryl, or aralkyl groups. Some of these compounds may not be particularly stable under the reaction conditions where $R^4$ is H for all $R^4$ groups. It is generally preferred that the $R^4$ groups of the silazane should be hydrocarbon groups and preferably the hydrocarbon group should be methyl or phenyl as, for example, in hexamethyldisilazane, $(Me_3Si)_2NH$. When preparing the esters on a commercial scale it may be advantageous to employ silyl chlorides such as, for example, $Me_3SiCl$, in conjunction with a weak base such as, for example, $Et_2NH$ to give silylamines for example $Me_3Si\cdot NEt_2$. The reaction can be followed by measuring the amount of volatile amine or ammonia produced if such compounds are decomposition products. Silazanes which give rise to ammonia or volatile amines are preferred because the base is volatilized under the reaction conditions, thereby avoiding $\Delta^2$ isomerization which might otherwise occur. An inert gas is desirably passed through the reaction mixture to entrain volatile products and keep out moisture.

Silanes such as $R^4_3SiH$ where $R^4$ has the above-given meaning are not particularly suitable in this process since in general they are too reactive. Where the silylating agent is a halide, e.g., $Me_3SiCl$, causing formation of hydrogen halide during silylation, a weak base, e.g., pyridine, is desirably used as acid acceptor. Strong bases may cause isomerization of the cephalosporin derivative to the corresponding $\Delta^2$ compound.

At least 1 mole of organosilicon compound, is used, and an excess of up to 3 moles, may be used to effect silylation. Undiluted organosilicon compounds may be employed as the reaction medium for the silylation or an inert diluent such as a hydrocarbon, e.g., benzene, toluene or a zylene, or a halogenated hydrocarbon, e.g., chloroform or methylene chloride may be used.

The silyl or stannyl ester group is easily split by exposing the derivative to an excess of a compound(s) containing active hydrogen, e.g., water, acidified or basified water, alcohols or phenols.

The acylation may be carried out in an aqueous medium, with an acid halide, for example in an aqueous solution of a water-miscible ketone such as acetone, or in an aqueous solution of tetrahydrofuran, preferably also in the presence of an acid binding agent for example sodium bicarbonate. The pH is preferably maintained at from 5 to 7 during the reaction which may be carried out at temperatures of from 0° to 25° C. The acylation may also be carried out in an organic solvent medium such as ethyl acetate by, for example, simple refluxing.

Alternatively the acylation may be affected with an acid halide or mixed anhydride under substantially anhydrous conditions in the liquid phase in an inert Lewis base (preferably one having a tertiary nitrogen atom) having a dielectric constant above 15 and preferably above 30 and containing a hydrogen halide acceptor. The dielectric constant of the base is advantageously within the range of 30–40 and the base is preferably N,N-dimethylacetamide or N,N-dimethylformamide. The reaction may be carried out on the free 4-COOH compound, on an ester thereof or on an acid addition salt, e.g., the hydrogen p-toluenesulphonate of the 4-COOH compound or ester thereof. One may employ an acid addition salt of said ester under the aforesaid anhydrous conditions since this derivative can be obtained in high yield from the N-deacylation step (see below). Thereafter, if desired, the ester group is removed. The acid halide is advantageously the chloride or bromide.

A further alternative technique for affecting acylation is to employ, as acylating agent, an α-aminoarylacetyl chloride having the free amino group protected as an acid addition salt preferably the hydrochloride.

Methods of effecting acylation under substantially anhydrous conditions are described more fully in British Pat. No. 1,104,937.

PREPARATION OF 7β-AMINO-3-THIOETHERIFIED METHYL-CEPH-3-EM-4-CARBOXYLIC ACIDS (A) AND

7β-ACYLAMIDO-3-THIOETHERIFIED METHYLCEPTH-3-EM-4-CARBOXYLIC ACIDS (B)

Compounds (A) are required as starting materials in the acylation step described above and this preparation is conveniently described with that of compounds (B).

The 3-thioetherified methyl compounds may be prepared from the corresponding 3-acetoxymethyl compounds.

a. Direct Displacement of Acetoxy Group in 3-Acetoxymethyl by an $SR^1$ Group

One method for preparing the thioether compounds according to the invention comprises reacting the corresponding 3-acetoxymethyl compound in a polar medium with the appropriate thiol so as to displace the acetoxy group and then recovering the desired 3-thioetherified methyl compound.

The reaction may conveniently be effected by maintaining the reactants in solution at a temperature such as, for example, 15°–100° C until the desired derivative is obtained in optimum yield. The reactants are advantageously employed in a ratio of about 1 molar equivalent of the 3-acetoxymethyl compound to 1–10 molar equivalents of the thiol. The pH value of the reaction solution is advantageously maintained within the limits 5.0 – 8, preferably 6 – 7.

Since the reaction appears to proceed by a polar or ionic mechanism it is necessary to employ a polar medium for the reaction to proceed at a measurable rate. Although water may be used as the polar medium it may act as a competitive nucleophile and one may use the thiol itself as the solvent. If the thiol is solid or liquid at the reaction temperature it may be used in association with a polar solvent, e.g., water. If the thiol is volatile or gaseous at the reaction temperature as in the case of, for example, methane thiol or ethane thiol improved yields may be obtained by carrying out the reaction under pressure, for example, by heating the components in a sealed tube or autoclave, if desired in association with an added polar solvent.

Preferred thiols are the lower alkane thiols and a particularly preferred lower alkane thiol is methanethiol.

The reaction product may be separated from the reaction mixture, which may contain, for example, unchanged cephalosporin and other substances, by a variety of processes including crystallization, counter current separation, ionophoresis, paper chromatography, thin layer chromatography or by chromatography on ion-exchange resins.

b. Indirect Preparation of Thioethers

Alternatively, thioetherification can be affected indirectly by first converting the 3-hydroxymethyl compound to a compound having at the 3-position the group —$CH_2X$ such that the acid HX has a pKa of not more than 4.0, and preferably not more than 3.5 (as measured in water at 25° C) and reacting the resulting 3-$XCH_2$-ceph-3-em-4-carboxylic acid or ester (see below where X= halogen) with a thiol so that the thiol residue replaces the group X and the desired 3-thioetherified methyl compound or its 4-ester is obtained.

The indirect reaction may be depicted as follows, taking for illustrative purposes only the preparation of a 3-methylthiomethyl compound of the formula (I) starting from the corresponding 3-hydroxymethyl compound:

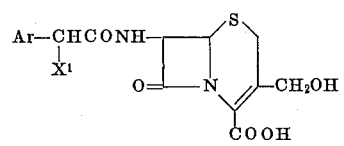

(I) | Esterification at 4—COOH with readily removable group

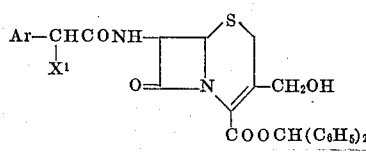

(II) | Esterification at 3—$CH_2OH$ with acid having pKa ≼ 4

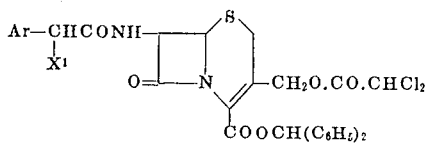

(III) | Removal of ester group at 4—COOH

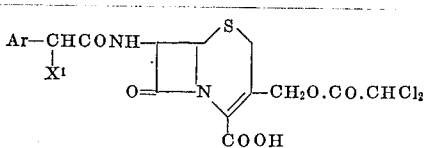

(IV) | Substitution of ester group at 3—$CH_2OH$ with thioether group

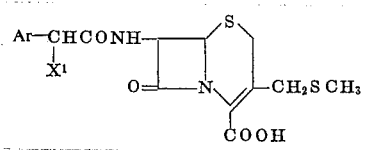

It will of course by understood that where $X^1$ in the above scheme is an amino group it is desirably protected.

In Step (I) the 7β-acylamido-3-hydroxymethyl-ceph-3-em-4-carboxylic acid compound is first esterified with a group which is readily removable when desired. This may conveniently be achieved by reaction with diphenyldiazomethane. It should be noted when substituting some X groups by a thioether group, that a 4-ester group is essential at that stage but when substituting other X groups by a thioether group the presence of a 4-ester group is undesirable at that stage: this is explained in more detail below.

In Step (II) the resulting 7β-acylamido-3-hydroxymethyl-ceph-3-em-4-carboxylic acid ester is acylated with dichloroacetyl chloride to yield the desired 7β-acylamido-3-$CH_2O \cdot COCHCl_2$-ceph-3-em-4-carboxylic acid ester.

After removal of the ester group on the 4-COOH group, e.g., in the case of diphenylmethyl by trifluoroacetic acid in conjunction with anisole in Step (III), the 3-$CH_2O \cdot CO \cdot CHCl_2$ group is reacted in Step (IV) with the chosen thiol in a polar medium to yield a 3-thioetherified methyl compound. If at this stage the 7β-acylamido group is not the group of choice this may be removed, e.g., as described below, and the resulting 7β-amino compound reacylated. Preferred thiols are the loweralkane thiols and a particularly preferred lower alkane thiol is methane thiol.

The group X is preferably one of two main types depending on whether a halogen atom or an oxygen atom is directly attached to the 3-methylene group, these two types of group will be discussed in turn under the respective headings: halogens; oxygen leaving-groups. The selected acid HX should be chosen so that it has a pKa of not more than 4.0.

HALOGENS (X = Cl, Br, or I)

When X represents certain halogen atoms, particularly iodine, the 4-carboxy group may be esterified. Since esters are generally without substantial antibiotic activity, and moreover since the corresponding isomeric ceph-2-em-4-carboxylic acids are also generally without substantial antibiotic activity, it is desirable to use as esterifying group a group which can be readily introduced and removed without appreciable $\Delta^3 \rightarrow \Delta^2$ isomerization (which is known to be likely to occur in such reactions). Preferred esterifying groups include the diphenylmethyl, 2,2,2-trichloroethyl and t-butyl groups; the diphenylmethyl group can be readily introduced by means of diphenyldiazomethane, and removed by means of a mixture of trifluoroacetic acid and anisole at room temperature whilst the 2,2,2-trichloroethyl group may be split off by an agent such as zinc/acetic acid, zinc/formic acid, zinc/lower alcohol or zinc/pyridine.

The 3-CH$_2$X compounds, where X represents Cl or Br, can be prepared from the corresponding 3-CH$_2$OH compounds, the 4-COOH group being esterified, by standard methods for the replacement of —OH by Cl or Br. For example, the 3-CH$_2$Cl compounds can be prepared from the corresponding 3-CH$_2$OH compounds by reaction with thionyl chloride or acid chlorides such as N,N-dialkyl chlorosulphinamides, e.g., N,N-dimethylchlorosulphinamide, or N,N-diarylchlorosulphinamides. The 3CH$_2$Br compounds may be similarly prepared by reaction of the corresponding bromo- compounds with the 3-CH$_2$OH compounds or by reaction of the latter with PBr$_3$ and pyridine. The 3-CH$_2$I compounds can be prepared from the corresponding chlorides and bromides, e.g., by reaction with an alkali metal iodide.

The 3-CH$_2$OH compounds can be prepared for example by hydrolysis of the corresponding 3-CH$_2$·O·COCH$_3$ compounds. The hydrolysis may be effected enzymatically, using, for example, wheat germ esterase or an esterase of the genus Rhizobium as described in Belgian Pat. No. 671,692, or an esterase derived from orange peel, as described in British Pat. No. 966,222.

OXYGEN LEAVING-GROUPS

Another class of starting materials useful in the process according to the invention has the partial formula

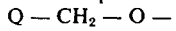

(where Q is the remainder of the cephalosporin molecule). This class includes esters of acetic acid derivatives having at least one electron-withdrawing substituent on the α-carbon atom, and esters of nuclear substituted benzoic acids, the nuclear substituent also being of the electron-withdrawing type. Thus the acid HX may be any of the various haloacetic acids (dichloroacetic acid being particularly preferred), methoxy-, alkylthio-, or cyano-acetic acid, glyoxylic acid, phenylpropiolic acid, a hemi-ester of malonic or oxalic acid, phenylglyoxylic acid, or a subsituted phenylglyoxylic acid, the substituent(s) being for example one or more halogen atoms (F, Cl, Br, or I), methoxy groups or methyl groups. When the acid HX is a substituted benzoic acid, the choice of the substituent in the benzene ring will be influenced to some extent by a consideration of the stereochemistry of the benzoic acid HX. In general we prefer the phenyl group to be substituted in the 3- or 4- position rather than the 2-position since substitution at the 2-position gives rise to the maximum steric hinderance. Thus possible substituents include, for example, 4-methyl, 3- chloro or bromo, 3-, or 4- nitro or 3,5-dinitro, 3-, or 4-trifluoromethyl, 4-carbamoyl, 3-, or 4-(esterified carboxyl), or 3-, or 4-cyano.

The acid HX may also be formic acid.

When the group X contains a reactive center, e.g., an active chlorine atom as in a dichloroacetoxy group, the incoming nucleophile may attack at this center also. Under such circumstances, it is desirable to use a corresponding excess of the incoming nucleophile, e.g., two equivalents excess when dichloroacetoxy is displaced.

The starting materials having the partial formula

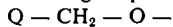

(where Q is as hereinbefore defined) are conveniently prepared by acylation of a cephalosporanic acid derivative having a 3-hydroxymethyl group. The acylating agent is preferably a reactive derivative of an acid such as a keten (where this exists), an acid halide, e.g., a chloride or bromide, an anhydride or mixed anhydride, e.g., with pivalic acid or formed with a haloformate, or an active ester or azide; alternatively, the acid itself can be used, together with an esterifying agent, e.g., carbonyldiimidazole or a carbodiimide such as N,N'-diethyl-, dipropyl-, or -diisopropyl-carbodiimide, or preferably N,N'-dicyclohexyl-carbodiimide.

The acylation should be effected under such conditions that both lactone formation and $\Delta^3 \rightarrow \Delta^2$ isomerization are substantially avoided. Lactone formation can be reduced by esterification of the 4-carboxy group before acylation. The esterifying group should be readily introducible and removable withour resulting in $\Delta^3 \rightarrow \Delta^2$ isomerization. As mentioned above preferred protecting groups are the diphenylmethyl group and the 2,2,2-trichloroethyl group which can be readily introduced and removed (after acylation of the 3-CH$_2$OH group) substantially without $\Delta^3 \rightarrow \Delta^2$ isomerization.

The esterifying group is preferably removed before the cephalosporin is reacted with the incoming nucleophile.

REACTION CONDITIONS FOR THE SUBSTITUTION OF X BY A THIOETHER GROUP

The reaction may conveniently be affected by maintaining the reactants in solution at a moderate temperature, e.g., 0°–120 C., preferably 35°–75° C, advantageously about 50° C. Reactions are usually complete (in aqueous solvents) in about 2 hours at 60°, and in correspondingly longer times at lower temperatures or correspondingly shorter times at higher temperatures. The reaction is advantageously effected using from one molar equivalent to 10 molar equivalents of incoming nucleophile. The pH value of the reaction solution under aqueous conditions is advantageously maintained within the limits 5–8, preferably 6–7. If necessary the pH of the solution should be adjusted to the desired value by the addition of a buffering agent such as sodium acetate. When working under non-aqueous conditions, the reaction medium should be neither extremely basic nor extremely acidic.

When the cephalosporin starting material is in the free acid form, it is desirable to employ a polar medium for the reaction to proceed. The most generally suitable is water but organic solvents such as formamide, dimethylformamide or acetone may be employed. The organic solvents may be used in the presence or absence of water.

Where essentially non-aqueous conditions are used the thiol may itself be used as the reaction medium. Non-polar solvents may also be used, in which cases the addition of as little as 0.5 percent of water will often bring about the desired amount of polarity.

Organic media which may be used include lower alkanoic acid nitriles, e.g., acetonitrile or propionitrile; halogenated hydrocarbons, e.g., methylene chloride, carbon tetrachloride, chloroform, ethylene dichloride or perchloroethylene; lower nitroalkanes, e.g., nitromethane; nitro-aromatic compounds, e.g., nitrobenzene; cyclic ethers, e.g., dioxan or tetrahydrofuran; amides of the general formula R$^5$·CO·NR$^6$·R$^7$ where R$^5$ is a hydrogen atom or an alkyl group containing one to five carbon atoms and R$^6$ and R$^7$, which may be the same or different, are each a hydrogen atom or an alkyl group containing one to five carbon atoms, or, alternatively R$^6$ and R$^7$ together form a divalent aliphatic group which, together with the adjacent nitrogen atom, forms a heterocyclic ring. Examples of amides of this type are N,N-dimethylformamide, N,N-diethylformamide, N,N-dimethylacetamide, formamide and N-methylformamide. Other solvents which may be used include N-lower alkyl pyrrolidones, e.g., N-methylpyrrolidone and di-lower alkyl sulphoxides, e.g., dimethylsulphoxide.

The reaction medium need not be liquid at room temperature. Solids, e.g., acetamide may be used so long as they are liquid at the reaction temperature.

The reaction product may be separated from the reaction mixture, which may contain, for example, unchanged cephalosporin and other substances, by a variety of processes including recrystallization, ionophoresis, counter current separation, paper chromatography, thin layer chromatography or by chromatography on ion-exchange resins.

The replacement of X by the incoming thiol may require the assistance of a salt of mercury, silver, or gold, preferably mercury. The reaction conditions are generally as set out in British Pat. No. 1,101,424.

N-DEACYLATION FOLLOWED BY REACYLATION

Where the final product is a 7β-acylamido compound not having the desired acyl group, the 7β-acylamido compound may be N-deacylated to yield the corresponding 7β-amino compound and the latter acylated with an appropriate acylating reagent.

Methods of N-deacylating cephalosporin C derivatives having 7β-acylamido groups are known and one suitable method comprises treating a 7β-acylamido-3-thioetherified methylceph-3-em-4-carboxylic acid ester with an imide-halide forming component, converting the imide halide so obtained into the imino ether and decomposing the latter, e.g., by hydrolysis or alcoholysis. If desired, the ester group, if still intact, may be split off by hydrogenolysis or hydrobenolysis to yield the 4-carboxylic acid. Suitable readily removable ester groups are described above.

The 7β-acylamido group may be 5-amino-5-carboxypentanamido or a group derived therefrom, by acylation and/or esterification thereof; for example, the NH₂ group may be acylated with benzoyl chloride to form a benzamido group and/or the COOH group may be esterified with a silylating derivative as described above.

Suitable imide halide forming components include acid halides derived from the phosphorus acids, the preferred compounds being the chlorides such as, for example, phosphorus oxychloride or phosphorus pentachloride.

The reaction with the imide halide forming component may be carried out in the presence of an organic or inorganic base. Suitable organic bases include tertiary amines such as, for example, pyridine or dimethylaniline while calcium carbonate is an example of a suitable inorganic base.

The imide halide forming component may, if desired, be added to the 4-ester of the 7β-acylamido-3-thioetherified methyl-ceph-3-em-4-carboxylic acid in the form of a solution. Preferably the solution should be in an inert organic solvent such as a chlorinated hydrocarbon, e.g., methylene chloride.

The imide halide may be converted into the imino ether by reacting with an alcohol, preferably a lower alkanol, in the presence of a tertiary amine as described above and the imino ether may be decomposed by using water or a lower alkanol, e.g., methanol, in the presence of a basic or acidic catalyst. Acidic catalysts which may be used include mineral and organic acids such as hydrochloric acid, phosphoric acid, trifluoroacetic acid and p-toluenesulphonic acid. Suitable basic catalysts include ammonia and salts of weak acids with an alkali metal or alkaline earth metal.

This method of N-deacylation is described in greater detail in Belgian Pat. No 719,712.

N-Deacylation of a 7β-acylamido-3-thioetherified methylceph-3-em-4-carboxylic acid or derivative thereof may also be effected by direct acid hydrolysis, e.g., with 0.1N to N hydrochloric acid.

When the substituent at the 7β-amino group is a 5-amino-5-carboxypentanamido group the N-deacylation may be effected by the action of nitrosyl chloride as described in British Pat. No. 1017534.

Where the starting compound is a 7β-amino compound, it may be necessary to protect the 7β-amino group during the various reaction steps. This can be done, as described above, by acylation or alternatively, by means of another readily removable group which can be removed at a convenient point.

When the 7β-acylamido group contains an amino group it will be necessary (e.g., protect this during the various reaction stages. The protecting group is conveniently one which can be removed by hydrolysis without affecting the rest of the molecule, especially the lactam and 7β-amido linkages. The amine protecting group and the esterifying group at the 4-COOH position can be removed using the same reagent. An advantageous procedure is to remove both groups at the last stage in the sequence. Protected amine groups include urethane, arylmethyl (e.g., trityl) amino, arylmethyleneamino, sulphenylamino or enamine types. Such groups can in general be removed by one or more reagents selected from dilute mineral acids, e.g., dilute hydrochloric acid, concentrated organic acids, e.g., concentrated acetic acid, trifluoroacetic acid, and liquid hydrogen bromide at very low temperatures, e.g., −80° C. A convenient protecting group is the t-butoxycarbonyl group, which is readily removed by hydrolysis with dilute mineral acid, e.g., dilute hydrochloric acid, or preferably with a strong organic acid e.g., formic acid or trifluoroacetic acid) e.g., at a temperature of 0°–40° C., preferably at room temperature ( 15°–25° C). Another convenient protecting group is the 2,2,2-trichloroethoxycarbonyl group which may be split off by an agent such as zinc/acetic acid, zinc/formic acid, zinc/lower alcohols or zinc/pyridine. The NH₂ group may also be protected as NH₃+ by using the amino acid halide as its hydrohalide under conditions in which the amino group remains protonated.

| Type | Example | Usual name and analogues, etc. | Usual method of removal |
|---|---|---|---|
| Urethane | 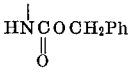 | Benzyloxycarbonyl, p-methoxy | HBr/AcOH (neat), CF₃COOH (neat), Liq. HBr at −80° C. |
| Do | 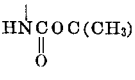 | t=Butoxycarbonyl | Dil. acid (HCl), CF₃COOH (neat). |
| Do | 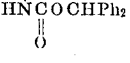 | Diphenylmethoxycarbonyl | CF₃COOH (neat), Dil. HCl etc. |
| Do | 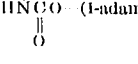 (1-adamantyl) | 1=Adamantyloxycarbonyl | Dil. HCl. |
| Arylmethyl amino | 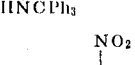 | Trityl | AcOH+H₂O, dil. HCl. |
| Sulphenyl amino | 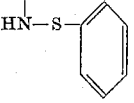 | o=Nitrophenylsulphenyl, p-nitro | Dil. HCl, NaI or Na₂S₂O₃, pH 2-A. |
| Enamine | 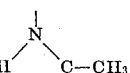 | β=Dicarbonyl; R=OEt, ethyl acetoacetate; R=CH₃, acetylacetone; R=Ph, benzoylacetone; R=OMe, methyl acetoacetate; R=C₂H₅, propionylacetone, and many β-diketones. | Acid labile in varying degree, dil. AcOH or HCl, etc. |

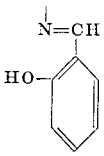

| Type | Example | Usual name and analogues, etc. | Usual method of removal |
| --- | --- | --- | --- |
| Arylmethyene amino |  | Anil (similar to β-dicarbonyl) from salicylaldehyde, 5-chlorosalicylaldehyde, 3,5-dichlorosalicylaldehyde; 2-hydroxy-1-naphthaldehyde; 3-hydroxy-pyridine-4-aldehyde. | Dil. HCl, formic acid. |
| Onium | $NH_3^+$ |  | Base. |
| Urethane | HN·CO·OCH$_2$CCl$_3$ | β,β,β=trichloroethoxycarbonyl | Reducing agents, e.g. Zn/acetic acid. |

The sulphoxide compounds, according to the invention, may be prepared by acylation of the appropriate 7β-amino compound or by selective oxidation of a 3-thioetherified compound, e.g., using dibenzoyl peroxide or chromic oxide or by nucleophilic displacement, the nucleophile being the sulphenate anion derived from sulphenic acid, $R^1SOH$, or a salt thereof.

The compounds according to the invention may be formulated for administration in any convenient way, by analogy with other antibiotics and the invention therefore includes within its scope a pharmaceutical composition comprising a 7β-acylamido-3-thioetherified methylceph-3-em-4-carboxylic acid of formula I or a non-toxic derivative, e.g., salt thereof (as herein defined) adapted for use in human or veterinary medicine. Such compositions may be presented for use in conventional manner with the aid of any necessary pharmaceutical carrier or excipients.

The invention therefore provides pharmaceutical compositions comprising a 7β-acylamido-3-thioetherified methylceph-3-em-4-carboxylic acid of formula I or a non-toxic derivative thereof (as herein defined) in association with a pharmaceutical carrier or excipient. The compositions are preferably presented in a form suitable for absorption by the gastro-intestinal tract. Tablets and capsules for oral administration may be in unit dose presentation form, and may contain conventional excipients such as binding agents, for example, syrup, acacia, gelatin, sorbitol, tragacanth, or polyvinylpyrrolidone; fillers, for example lactose, sugar, maize-starch, calcium phosphate, sorbitol or glycine; lubricants, for example, magnesium stearate, talc, polyethylene glycol, silica; disintegrants, for example, potato starch or acceptable wetting agents such as sodium lauryl sulphate. The tablets may be coated according to methods well known in the art. Oral liquid preparations may be in the form of aqueous or oily suspensions, solutions, emulsions, syrups, elixirs, etc., or may be presented as a dry product, for reconstitution with water or other suitable vehicle before use. Such liquid preparations may contain conventional additives such as suspending agents, for example, sorbitol syrup, methyl cellulose, glucose/sugar syrup, gelatin, hydroxyethylcellulose, carboxymethyl cellulose, aluminum stearate gel or hydrogenated edible fats; emulsifying agents, for example, lecithin, sorbitan mono-oleate or acacia; non-aqueous vehicles which may include edible oils, for example, almond oil, fractionated coconut oil, oily esters, propylene glycol, or ethyl alcohol; preservatives, for example, methyl or propyl p-hydroxybenzoates or sorbic acid. Suppositories will contain conventional suppository bases, e.g., cocoa butter or other glyceride.

Compositions for injection may be presented in unit dose form in ampoules, or in multidose containers with an added preservative. The compositions may take such forms as suspensions, solutions, emulsions in oily or aqueous vehicles, and may contain formulator agents such as suspending, stabilizing and/or dispersing agents. Alternatively the active ingredient may be in powder form for reconstitution with a suitable vehicle, e.g., sterile, pyrogen-free water, before use.

The compositions may also be prepared in suitable forms for absorption through the mucous membranes of the nose and throat or bronchial tissues and may conveniently take the form of powder or liquid sprays or inhalants, lozenges, throat paints, etc. For medication of the eyes or ears, the preparations may be presented as individual capsules, in liquid or semi-solid form, or may be used as drops, etc. Topical applications may be formulated in hydrophobic or hydrophilic bases as ointments, creams, lotions, paints, powders, etc.

For veterinary medicine the composition, may, for example, be formulated as an intramammary preparation in either long acting or quick-release bases.

The compositions may contain from 0.1 percent upwards, preferably from 10–60 percent of the active material, depending on the method of administration. Where the compositions comprise dosage units, each unit will preferably contain 50–500 mg. of the active ingredient. The dosage as employed for adult human treatment will preferably range from 100–3,000 mg. for instance 1,500 mg. per day, depending on the route and frequency of administration.

The compounds according to the invention may be administered in combination with other therapeutic agents such as antibiotics, for example other cephalosporins, the penicillins or tetracyclines.

In order that the invention may be well understood the following examples are given by way of illustration only. In the examples:

N.M.R. spectra were obtained at 60 MHz.

Paper electrophoreses were carried out on Whatman No. 3 MM paper at pH 1.9 (98 percent formic acid (16.7 ml.), glacial acetic acid (84 ml.), acetone (105 ml.) and water (495 ml.)) at a potential of 15–20 volts/cm.

The solvent systems utilized in the paper chromatography examinations are as follows:

System 1 ethyl acetate : n-butanol: 0.1M-sodium acetate (pH 5.0)= 8:1:8, run downwards with the upper phase (in equilibrium with lower phase) as developing solvent, at 38° C, on Whatman No. 1 paper buffered to pH 5.0.

System 2 n-propanol : water = 7:3, run downwards at room temperature on Whatman No. 1 paper.

System 3 comprises the upper phase of the system described below for thin-layer chromatography, run downwards on Whatman 3MM paper buffered to pH 6 with 0.05M-sodium dihydrogen phosphate brought to pH 6 with phosphoric acid.

Thin-layer chromatography (TLC) was carried out with layers of silica gel, with a solvent comprising the upper phase of the system n-butanol : ethanol:water = 4:1:5.

Chromatographic papers and plates were examined under ultraviolet light for absorbing and fluorescing spots.

The signs of the J values are not given. "Petroleum spirit" is the fraction, b.p. 40°–60°.

Reaction mixtures were dried over dried magnesium sulphate and evaporated at 40° C at approx. 20 mm Hg, unless otherwise stated.

EXAMPLE 1

Preparation of 7β-(D-α-Aminophenylacetamido)-3-Methylthiomethylceph-3-Em-4-Carboxylic acid The title compound was prepared via the following reaction scheme (the steps are described in more detail below)

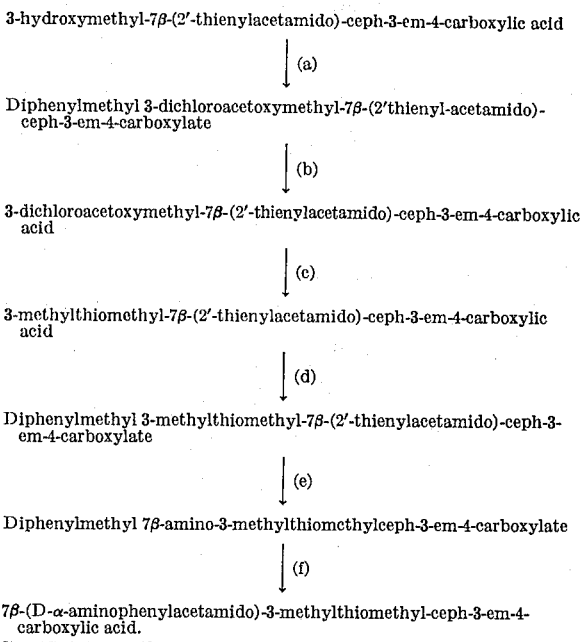

a. Diphenylmethyl 3-Dichloroacetoxymethyl-7β-(2'-Thienylacetamido)-Ceph-3-Em-4-Carboxylate Diphenylmethyl 3-hydroxymethyl-7β-(2'-thienylacetamido)ceph-3-em-4-carboxylate (2.08 g., 4 mmole.), prepared by reacting 3-hydroxymethyl-7β-(2'-thienylacetamido)ceph-3-em-4-carboxylic acid with diphenyldiazomethane, and pyridine (1.58 ml., 20 mmole) were dissolved in dry tetrahydrofuran (100 ml.) and cooled to −20°. Dichloroacetyl chloride (2.95 g; 1.96 ml; 20 mmole.) in dry tetrahydrofuran (5 ml.) was added dropwise. Fifteen minutes after the addition the mixture was filtered and evaporated, and the residue was partitioned between ethyl acetate and sodium bicarbonate solution. The organic layer was washed with brine, dried and taken to small volume; this solution was then added dropwise to petrol to give a white solid (2.1 g; 85 percent), m.p. >60° (softens), $[\alpha]_D^{23} = +17.5°$ (c 1.14, dioxan), $\lambda\lambda_{max}$ (ethanol) 236 nm ($\epsilon$ = 13,300), 259nm ($\epsilon$ = 7,600), $\nu_{max}$ (CHBr$_3$) 1783 (β-lactam), 1760 (CO$_2$CHCl$_2$), 1725 (COOR), 1680 and 1510 cm$^{-1}$ (CONH), N.M.R. spectrum (CDCl$_3$)-COCHCl$_2$ 4.13τ, R$_F$ = 0.37 (Kieselgel G plate; benzene: ethyl acetate = 5:1).

b. 3-Dichloroacetoxymethyl-7β-(2'-Thienylacetamido)ceph-3-Em-4-Carboxylic Acid

Diphenylmethyl 3-dichloroacetoxymethyl-7β-(2'-thienylacetamido)ceph-3-em-4-carboxylate (6.8 g.) was dissolved in anisole (5 ml.), and trifluoroacetic acid (15 ml.) was added. After 4 minutes the solvent was removed at at 30°/2 mm. The residue was dissolved in ethyl acetate and re-evaporated; the gum was redissolved in ethyl acetate (10 ml.) and added dropwise, with stirring, to petroleum ether (400 ml.). The product was obtained as a yellow solid, m.p. >60° (softens; decomp. at 99°) (4.92 g.; 95%), $[\alpha_D^{27} = +56°$ (c, 0.7; dioxan), $\lambda\lambda_{max}$. (ethanol) 237 nm ($\epsilon$=12,500), 259nm ($\epsilon$ = 7,500), $\nu_{max}$ (CHBr$_3$) 3390 (NH), 1788 (β-lactam), 1760 (COOR), 1685 and 1518 (CONH), 1735 and 1715 cm$^{-1}$(C OOH). N.M.R. spectrum (CDCl$_3$) —O·COCHCl$_2$ 4.0τ.

The dicyclohexylamine salt crystallized from acetone, m.p.>100° (softens; decomp. at 210° ), $[\alpha]_D^{25}$= +36°(c 1.0, chloroform), $\lambda\lambda_{max}$ (ethanol) 235nm ($\epsilon$ = 13,600), 265 nm ($\epsilon$ = 6,950), $\nu_{max}$ (CHBr$_3$) 1774 (β-lactam), 1765 (COOR), 1635 (COO$^-$), 1680 and 1518 (CONH), 812 cm$^{-1}$ (CHCl$_2$). N.M.R. spectrum (CDCl$_3$) —CH$_2$·O·COCHCl$_2$ 3.91τ. (Found C, 52.0; H, 5.7; N, 6.3; Cl, 14.2. C$_{16}$H$_{14}$Cl$_2$N$_2$O$_6$S$_2$. (C$_6$H$_{11}$)$_2$NH requires C, 52.0; H, 5.8; N, 6.5; Cl, 14.8 percent).

c. 3-Methylthiomethyl-7β-(2'-Thienylacetamido)-Ceph-3-Em-4-Carboxylic Acid

3-Dichloroacetoxymethyl-7β-(2'-thienylacetamido)-ceph-3-em-4-carboxylic acid (9.04 g., 19.5 mmole) was dissolved in acetone (60 ml.) and refluxed at 60° for 4 hours with a solution of methanethiol (16.0 g., 0.33 mole, 17 equivalents), using a condenser at −70°. The solvents were removed and the oil partitioned between water and ethyl acetate. The organic phase was extracted into sodium bicarbonate solution (pH 8.0), which was washed with ethyl acetate, acidified, and extracted into ethyl acetate. The extraction into sodium bicarbonate and acidification was repeated twice. The final ethyl acetate solution was washed successively with water and brine, and was dried and evaporated to give a yellow oil (7 g.), which was dissolved in ethyl acetate (7 ml.) Scratching the glass walls of the vessel instigated crystallization of the title compound. The filtrate was poured slowly into light petroleum, to give more product (0.96 g., 13 percent yield). The crystalline crop (2.55 g., 34 percent yield) had m.p. 148.5° − 149°(decomp.), $[\alpha]_D^{23} + 57.9°$ (c 0.7, tetrahydrofuran), $\lambda_{max}$ (ethanol) 236 ($\alpha$ 13,250) and 267 nm. ($\epsilon$ 8,250), $\nu_{max}$ (bromoform) 1775 (β-lactam, 1725 (CO$_2$H), and 1680 and 1510 cm.$^{-1}$ (—CONH), N.M.R. (deuterochloroform)τ7.92 (3-proton singlet) (S·CH$_3$), R$_F$ 0.6 (System 1).

d. Diphenylmethyl 3-Methylthiomethyl-7β-(2'-Thienylacetamido)-Ceph-3-Em-4-Carboxylate 3-Methylthiomethyl-7β-(2'-thienylacetamido)-ceph-3-em-4-carboxylic acid (6.06 g., 15.7 mmole) was dissolved in tetrahydrofuran (90 ml.). Diphenyldiazomethane (4.3 g., 1.3 equivalents) in light petroleum (90 ml.) was added, with a small piece of porous pot. After 3 hr. the solution was filtered, acetic acid (0.5 ml.) was added, and the solution was evaporated to give a gum which was dissolved in ethyl acetate and added slowly to light petroleum to give the title compound as a pale yellow powder, m.p. 134°–137° (decomp.) $[\alpha]_D$ − 17.5°, (c 0.8 dioxan), $\lambda_{max}$ (ethanol) 260 nm. ($\epsilon$7,800)$\nu_{max}$ (bromoform) 1780 (β-lactam), 1723 and 1284 (CO$_2$ R), and 1685 and 1510 cm.$^{-1}$ (—CONH) N.M.R. (deuterochloroform)τ8.17 (3-proton singlet) (CH$_2$—S—CH$_3$), R$_F$ 0.61 (Kieselgel G, Benzene-ethylacetate = 5:1) (Thin layer chromatography— T.L.C.). (Found C, 61:1; H, 4.8; N, 5.0; S, 17.3 C$_{28}$H$_{26}$N$_2$O$_4$ S$_3$ requires C, 61.2; H, 4.7; N, 5.1; S, 17.5 percent).

e. Diphenylmethyl 7β-amino-3-methylthiomethylceph-3-em-4-carboxylate

Crude diphenylmethyl 3-methylthiomethyl-7β-(2'-thienylacetamido)-ceph-3-em-4-carboxylate (9.36 g. 17 mmole) in dry methane dichloride (140 ml.) was cooled to −15°, and pyridine (17.1 ml., 212 mmole, 12.4 equiv.) was added. Phosphorus pentachloride (12.74 g., 61 mmole) in dry methylene dichloride (200 ml.) was added so that the temperature did not rise above −10°. The mixture was then stirred at −10° to −12° for 30 minutes, when methanol (206 ml.) was added, initially very slowly so that the temperature did not rise above −10°. The mixture was warmed to 20° during 50 minutes, and the methanolysis of the imino chloride followed by T.L.C. (Kieselgel G, benzene:ethyl acetate = 1:1) by withdrawing aliquots and shaking them with N-hydrochloric acid; the starting material, R$_F$ 0.73, and the desired product, R$_F$ 0.46, could be discerned in samples of the organic phase. The spot, R$_F$ 0.46, reached a maximum after a further hour. The mixture at 0° was treated with N-hydrochloric acid (350 ml.). The acidified mixture was warmed to room temperature with stirring during 90 minutes, and then separated. The organic layer was washed twice each with sodium bicarbonate solution, dilute hydrochloric acid, water, and brine, and then dried. Evaporation gave an oil which rapidly deposited crystals; these crystals were washed with ethyl acetate and dried to give the title compound (1.020 g., 14 percent yield), m.p. 168°–170°(decomp)., $[\alpha]_D^{23}$ −20° (C, 0.6, dimethyl sulphoxide), $\lambda_{max}$. (ethanol) 265 nm. ($\nu$6,100),$\nu_{max}$. (Nujol) 1775 (β-lactam), 1720 and 1260 (CO$_2$R), and 706 and 748 cm.$^{-1}$ (phenyl), N.M.R. (d$_6$-dimethylsulphoxide)τ8.12 (3-proton singlet) (—S—CH$_3$), 6.28 (broad 2-proton singlet)(—CH$_2$—S—CH$_3$), R$_F$ 0.46 (Kieselgel G, benzene in ethyl acetate=1:1)(T.L.C.).

f. 7β-(D-α-Aminophenylacetamido)-3-Methylthiomethyl-Ceph-3-Em-4-Carboxylic Acid

N-(t-Butoxycarbonyl)-D-phenylglycine, (890 mg., 2.3 mmole) in dry tetrahydrofuran (10 ml.) at −10° was treated with triethylamine (350 mg., 2.3 mmole) and a solution of isobutyl chloroformate (496 mg., 2.3 mmole) in dry tetrahydrofuran (2 ml.), so that the temperature did not rise above −6°. The solution was stirred for 30 minutes at 20°, and filtered. The filtrate was added to a suspension of diphenylmethyl 7β-amino-3-methylthiomethyl-ceph-3-em-4-carboxylate (960 mg., 2.3 mmole) in acetonitrile (7.5 ml.) containing N,N-dimethylacetamide (2.5 ml.). After 30 minutes and at 40° more dimethylacetamide (12.5 ml.) was added, and the solution stirred for 30 minutes at 30°-25°. The solvents were then evaporated off; the liquid was dissolved in ethyl acetate and washed successively with saturated aqueous sodium bicarbonate, water, and brine, and dried and evaporated to give an oil (2.084 g.). The oil was dissolved in anisole (2 ml.) and trifluoroacetic acid (8 ml.), and the solution was evaporated at 40° and 2mm. after 4 minutes. The product was dissolved in ethyl acetate and precipitated with light petroleum giving a powder (1.573 g), which was suspended in water (60 ml.) and shaken well with LA—1 (OAc⁻) (20 percent v/v in ether; 50 ml.). After centrifuging, the aqueous phase was extracted with ethyl acetate (3 × 40 ml.) and freeze-dried to give a solid (968 mg.), which was washed with ether, yielding the title compound as a white granular product (620 mg.), decomp at 160°, $[\alpha]_D^{26}$ + 54°, (c 0.8, water containing 12 drops dimethylsulphoxide per ml.), $\lambda_{max}$. (pH 6 aqueous phosphate) 263 nm ($\epsilon$8,600), $\nu_{max}$. (Nujol 1765 (β-lactam), 1960 and 1520 (—CONH), and 1590 cm.⁻¹ ($CO_2^\ominus$), N.M.R. ($D_2O$) $\tau$2.53 (5-proton broad singlet) (Ph). 2.47, 4.78 (α-phenylglycine), 8.03-8.07-broad singlet (—S—Me). (Found C, 52.7; H, 5.6; N, 9.5; S, 10.6. Calc. for $C_{17}H_{19}N_3O_4S_2 \cdot 1\frac{1}{2}H_2$). 1 $C_8H_8O_2N$: C, 52.7; H, 5.5; N, 9.8; S, 11.2). This substance contained two components moving to the cathode on electrophoresis at pH 1.9, one with the same electrophoretic behavior as a α-phenylglycine.

EXAMPLE 2

Alternative Preparation of 7β-(D-α-Aminophenylacetamido)-3-Methylthiomethyloceph-3-Em-4-Carboxylic Acid The title compound was prepared via the following reaction scheme (the steps are described in more detail below).

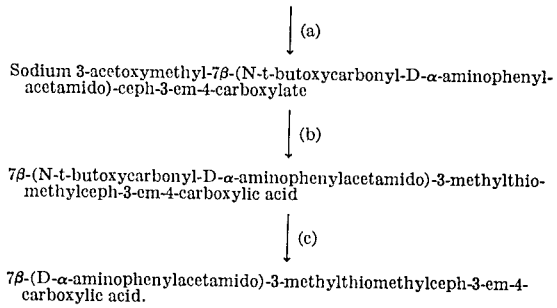

3-acetoxymethyl-7β-aminoceph-3-em-4-carboxylic acid

↓ (a)

Sodium 3-acetoxymethyl-7β-(N-t-butoxycarbonyl-D-α-aminophenylacetamido)-ceph-3-em-4-carboxylate ↓ (b)

7β-(N-t-butoxycarbonyl-D-α-aminophenylacetamido)-3-methylthiomethylceph-3-em-4-carboxylic acid ↓ (c)

7β-(D-α-aminophenylacetamido)-3-methylthiomethylceph-3-em-4-carboxylic acid.

a. Sodium 3-Acetoxymethyl-7β-N-T-Butoxycarbonyl-D-α-Aminophenylacetamido)-Ceph-3-Em-4-Carboxylate Triethylamine (8.0 ml.) was added to a solution of D(-)-α-t-butyloxycarbonylamino-α-phenylacetic acid (12.5 g.) in acetone (125 ml.) containing ethyl chloroformate (5.25 ml.) cooled to −10°. After ten minutes the resulting suspension was added to a solution of 3-acetoxymethyl-7β-a ninoceph-3-em-4-carboxylic acid (7—ACA) (13.6 g.) in 50 percent aqueous acetone (100 ml.) containing triethylamine (7 ml.) cooled to −10° for 30 minutes and warmed to 40° for 15 minutes, and filtered to remove unreacted 7—ACA (0.8 g.). The filtrate was evaporated to remove all acetone. The residue was diluted with water (100 ml.), stirred with chloroform (250 ml.) and acidified with 2N-hydrochloric acid (25 ml.). The chloroform extract was washed twice with 2N-hydrochloric acid (each 25 ml.) and the aqueous layers re-extracted twice with chloroform (each 125 ml.). The combined extracts were dried over sodium sulphate and evaporated to a forth (32.5 g.) which was triturated with isopropyl ether (200 ml.) to obtain a yellow solid, which was collected by filtration, washed with isopropyl ether and dried at 40° in vacuo. The solid (25.9 g.), dissolved in acetone (195 ml.), was added to 10 percent solution of sodium 2-ethylhexanoate in acetone (195 ml.) and the resultant slurry cooled to 0° and diluted with acetone (100 ml.). The crude sodium salt was collected by filtration, washed with acetone and dried at 40° in vacuo to yield 25.6 g. of a yellow solid which was recrystallized from water (80 ml.). The sodium salt was collected by filtration at 0°, washed with ice-cold water, and with ether to displace the mother liquors, and dried at 40° in vacuo to yield 9.28 g. (35.2 percent of theory), [60 ]$_D$ + 46.5°, $\lambda_{max}$. 261 nm.: $E_{1cm}^{1\%}$, 166, $\lambda_{min}$. 239 nm.: $E_{1cm}^{1\%}$. 130. The free acid is obtained from the sodium salt by acidification with hydrochloric acid.

b. 7β-(N-T-Butoxycarbonyl-D-α-Aminophenylacetamido)-3-Methylthiomethylceph-3-Em-4-Carboxylic Acid 3-Acetoxymethyl-7β-(N-t-butoxycarbonyl-D-α-aminophenylacetamido)ceph-3-em-4-carboxylic acid (35.0 g., 0.07 mole) was dissolved in the minimum volume of acetone and to this was added a solution of sodium bicarbonate (5.85 g., 0.07 mole) in water (300 ml.). The acetone was evaporated (rotary evaporator, bath 30°) leaving a slightly cloudy aqueous solution which was treated with methane thiol (10.1 g., 0.21 mole) in a sealed glass tube at 70° for 4 hr. The impure product was recovered as a sticky yellow foam (30.2 g.), which on trituration under petroleum ether (b.p. 40°-60°) afforded a yellow powder (26.2 g.), $\lambda_{max}$. (pH6 buffer) 262 nm. ($\epsilon$6,820). This was dissolved in acetone (40 ml.) and the solution treated with dicyclohexylamine (13.6 ml.) in acetone (20 ml.). After 10 min. precipitation began. The mixture was diluted with ether (20 ml.), refrigerated for 1 hr., and the solid collected by filtration, washed with a small amount of acetone and ether, then dried, giving the dicyclohexylamine salt as a yellow powder (21.2 g.). This salt was dissolved in ethyl acetate (1 l.) and 0.5N-hydrochloric acid (1 l.). The acidic material was recovered giving 7β-(N-t-butoxycarbonyl-D-α-aminophenylacetamido)-3-methylthiomethylceph-3-em-4-carboxylic acid as a pale yellow powder (11.5 g.), m.p. 93°-100, $R_F$ 0.80, trace spot at $R_F$ 0.64 (system 1), T.L.C. $R_F$ 0.51, [α ]$_D^{20}$ + 9.3° (c. 1.00, DMSO), $\lambda_{max}$. (pH6 buffer) 262 nm. ($\epsilon$8,690), $\nu_{max}$. (Nujol) 1744 (β-lactam), 1710 ($CO_2R$), 1690 (carboxylic acid) 1675, 1510 cm.⁻¹ (amide), $\tau(CDCl_3)$ 1.60 (2-proton broad signal; CONH, $CO_2H$), 2.66 (5-proton singlet; phenyl protons), 3.98 (1-proton doublet, J 8 Hz.; CONHCH), 4.31 (1-proton double doublet, J 5.9 Hz.; C—7 H), 4.68 (1-proton doublet; J 8 Hz.; CONHCH), 5.06 (1-proton doublet, J 5 Hz.; C—6 H), 6.22, 6.60 [two 1-proton doublets (branches of a quartet), J 17 Hz.; C—2 H₂], 6.53 (2-proton singlet; C—3 CH₂), 7.97 (3-proton singlet; SCH₃), 8.58 (9-proton singlet; t-Bu) [Found: C, 53.2; H, 5.8; N, 8.1; S, 12.4. $C_{22}H_{27}N_3O_6S_2$ (493.6) requires C, 53.6; H, 5.5; N, 8.5; S, 13.0 percent].

c. 7β-(D-α-Aminophenylacetamido)-3-Methylthiomethylceph-3-Em-4-Carboxylic Acid

7β-(N-T-Butoxycarbonyl-D-α-(N-t-Butoxycarbonyl-D-α-Aminophenylacetamido)- 3-methylthiomethylceph-3-em-4-carboxylic acid (1 g.) was suspended in acetic acid (2 ml.), concentrated hydrochloric acid (0.33 ml.) and water (1.67 ml.), and the suspension was heated at 50°. Solution was slowly obtained and after 50 min. it was cooled and shaken with Amberlite LA-2 (acetate form) (1 ml.) in ether (10 ml.). The aqueous layer was collected and combined with further aqueous extracts (2 × 10 ml.) of the organic layer. This combined extract was washed with ether (2 × 20 ml.), rotary evaporated to expel residual ether, and freeze-dried, giving 7β-(D-α-aminophenylacetamido)-3-methylthiomethylceph-3-em-4-carboxylic acid, monoacetic acid solvate as a pale yellow powder (0.62 g.), m.p. 220°-225° (decomp. softens at 215°), T.L.C. $R_F$ 0.23, $[\alpha]_D^{20}$ + 48.2° (c. 1.00, $H_2O$) $\nu_{max.}$ (pH 6 buffer) 263 nm. ($\nu$ 8.310), $\nu_{max.}$ (Nujol) 1758 ($\beta$-lactam), 1700 (acetic acid), 1680, 1540 (amide), 1600 (carboxylate), 690 cm.$^{-1}$ (phenyl), $\tau(D_2O)$ 2.38 (5-proton singlet; phenyl protons), 4.27 (1-proton doublet, J 5 Hz.; C—7 H), 4.67 (1-proton singlet; CONHCH), 4.83 (1-proton doublet, J 5 Hz,; C—6 H), 6.34, 6.70 [two 1-proton doublets (branches of a quartet), J 18 Hz.; C—2 $H_2$], 6.37 (2-proton singlet; C—3 $CH_2$), 7.88 (3-proton singlet; acetic acid), 7.96 (3-proton singlet; $SCH_3$).

EXAMPLE 3

Preparation of 7$\beta$-(D-$\alpha$-Aminophenylacetamido)3-N-Propylthiomethylceph-3-Em-4-Carboxylic Acid The title compound was prepared via the following reaction scheme (the steps are described in more detail below).

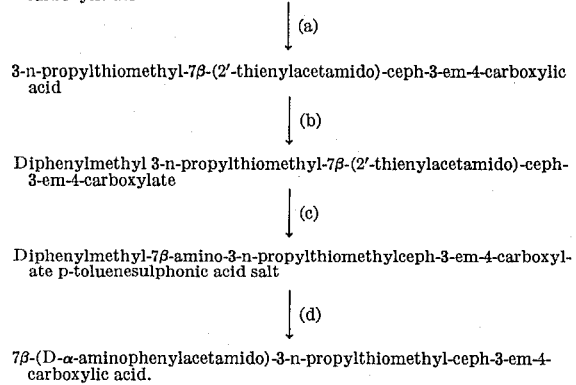

a. 3-N-Propylthiomethyl-7$\beta$-(2'-Thienylacetamido)-Ceph-3-Em-4-Carboxylic Acid A solution of 3-dichloroacetoxymethyl-7$\beta$-(2'-thienylacetamido)-ceph-3-em-4-carboxylic acid (prepared in the manner described in Example 1(b)) (2.33 g., 5.0 mmole) in acetone (20 ml.) was treated with n-propanethiol (3 ml. 2.54 g., 33 mmole) in acetone (30 ml.). Water (20 ml.) was added and the solution was maintained at 50° C for 1 hour. The acetone and excess n-propanethiol were removed by distillation, and the mixture was partitioned between sodium bicarbonate solution and ethyl acetate. The aqueous layer was acidified with dilute hydrochloric acid to pH 2.5, and extracted into ethyl acetate. The organic layer was then re-extracted into sodium bicarbonate, washed with ethyl acetate, acidified to pH 2.5, and extracted into ethyl acetate, which was washed successively with water and brine, dried, and evaporated to 20 ml. This solution was treated with ether (60 ml.), filtered, decolorized with charcoal, and added dropwise into light petroleum to give the nearly pure title compound (595 mg., 27 percent yield), m.p. 138°-140°C (decomp.), $[\alpha]_D$ + 51.4 (c 0.77, tetrahydrofuran), $\nu_{max.}$ (ethanol) 260 nm ($\lambda$8,450), 236 nm ($\epsilon$13,200), $\nu_{max.}$ (bromoform) 1780 ($\beta$-lactam), 1735 ($CO_2H$), and 1682 and 1515 cm.$^{-1}$ (—CONH), NMR (deuterochloroform) $\tau$7.52 (2-proton triplet) (—S—$CH_2Et$), 9.08 (3 proton triplet) (—$SCH_2$—$CH_2CH_3$), $R_F$ (System I) 0.79 (Found: C, 49.5; H, 4.9; N, 6.5; S, 22.7. $C_{17}H_{20}N_2O_4S_3$ requires C, 49.6; H, 4.8; N, 6.8; S, 23.2 percent).

b. Diphenylmethyl 3-N-Propylthiomethyl-7$\beta$-(2'-Thienyl-Acetamido)-Ceph-3-Em-4-Carboxylate 3-n-Propylthiomethyl-7$\beta$-(2'-thienylacetamido)-ceph-3-em-4-carboxylic acid (450 mg., 1.08 mmole) in dry tetrahydrofuran (15 ml) was reacted with diphenyldiazomethane (600 mg., 3.1 mmole) in light petroleum (5 ml), in the presence of a piece of porous pot. After 3 hours the purple solution was treated with 0.2 ml. of a mixture of equal parts methanol and acetic acid, and rotary-evaporated at 30°, to give a pale yellow oil which was dissolved in ethyl acetate; the solution was added slowly to petroleum ether, filtered, and dried (419 mg., 67 percent yield), to give the title compound m.p. 60°-65° (decomp.), $[\alpha]_D^{25}$ —22.9° (c 0.8, tetrahydrofuran), $\lambda_{max.}$ (ethanol) 260 nm ($\epsilon$7,900), $\nu_{max.}$ (bromoform) 1785 ($\beta$-lactam), 1726 ($CO_2R$), and 1680 and 1540 cm.$^{-1}$ (amide), N.M.R. (deuterochloroform) $\tau$7.7 (2-proton triplet) (—S—$CH_2CH_2CH_3$), 8.6 (multiplet) (—S—$CH_2CH_2CH_3$), 9.15 (3-proton triplet) (—S—$CH_2$—$CH_2$—$CH_3$), $R_F$ 0.84 (kieselgel G, benzene-ethyl acetate = 5:1) (thin layer chromatography).

c. Diphenylmethyl 7$\beta$-Amino-3-N-Propylthiomethylceph-3-Em-4-Carboxylate, P-Toluenesulphonic Acid Salt Crude diphenylmethyl 3-n-propylthiomethyl-7$\beta$ -(2'-thienylacetamido)-ceph-3-em-4-carboxylate (7.067 g. 12.2 mmole) in dry methylene dichloride (100 ml) and pyridine (9.65 ml., 9.4 g., 184 mmole) were cooled to $-15°$, and phosphorus pentachloride (9.26 g., 44.5 mmole) in dry methylene dichloride (150 ml.) was added so that the temperature remained below $-10°$. The mixture was then stirred at $-10°$ to $-12°$ for 30 minutes, cooled to $-20°$, and treated with methanol (147 ml.). (The addition was initially very exothermic and the methanol was added very slowly at first, the temperature being kept below $-10°$). The reaction was allowed to warm to room temperature and monitored by thin-layer chromatography (Kieselgel G, benzene-ethylacetate = 5:1) by shaking aliquots with N-hydrochloric acid and chromatographing a sample of the organic layer on the plate. The starting material $R_F$ 0.7, and the required product, $R_F$ 0.4, were detected; when the latter had reached a maximum, the mixture was cooled to 0°, and stirred with N-hydrochloric acid (250 ml.) for 1 hour while it warmed to 20°. The organic layer was then washed successively with saturated sodium bicarbonate solution, water, and brine, and dried and evaporated. A solution of the brown oil in ethyl acetate (5 ml.) was stirred with p-toluene-sulphonic acid (2.292 g., 12.0 mmole) in ethyl acetate (25 ml). Scratching the walls of the glass container initiated crystallization of the title compound (1.18 g.); treatment of the mother liquors with ether gave a second crop (1.07 g.). The combined yield was 30 percent, m.p. 158°-159° (decomp), $[\alpha]_D^{25}$ —95°(c 0.7, chloroform), $\nu_{max.}$ 263 nm ($\nu$7,300), $\nu_{max.}$ (Nujol) 1790 ($\beta$-lactam), 1720 ($CO_2R$), 1170 (O—$SO_2$) and 2650 cm.$^{-1}$, ($NH_3$ ), N.M.R. (deuterochloroform) $\tau$ 7.68 (3-proton singlet)

9.18 (3-proton triplet) ($SCH_2CH_2CH_3$) (Found: C, 58.7; H, 5.5; N, 4.3; S, 14.0. $C_{31}H_{39}N_2O_6S_3$. ½$H_2O$ requires C, 58.7; H, 5.5; N, 4.4; S, 15.1 percent). This compound moves to the cathode on electrophoresis at pH 1.9 $R_F$0.42 (Kieselgel G, benzene-ethylacetate = 1:1) (T.L.C.).

d. 7$\beta$-(D-$\alpha$-Aminophenylacetamido)-3-N-Propylthio-Methylceph-3-Em-4-Carboxylic Acid N-(t-Butoxycarbonyl)-D-phenylglycine (1.39 g., 5.5 mmole) was dissolved in dry tetrahydrofuran (13 ml.) and cooled to $-10°$. Triethylamine (0.8 ml., 5.5 mmole) was added, followed by a solution of isobutyl chloroformate (0.75 g., 5.5 mmole) in dry tetrahydrofuran (3 ml.), the reaction being kept between $-6°$ and $-10°$. The mixture was stirred for 30 minutes at room temperature, and filtered. The filtrate was added with stirring to a solution of diphenylmethyl 7 -amino-3-n-propylthiomethylceph-3-em-4-carboxylate, p-toluene sulphonic acid salt (2.25 g., 3.6 mmole) in acetonitrile (10 ml.) and dimethylacetamide (5 ml.). After 30 minutes, the solvents were evaporated off at 2mm and 40°, and the oil was dissolved in ethyl acetate, extracted successively with dilute sodium bicarbonate, water, and brine, and dried; the solution was slowly added to light petroleum, giving a solid (1.95 g.) which was treated with trifluoroacetic acid (8 ml.) in anisole (2 ml.). at 20° for 4 minutes. The solvents were evaporated off at 2 mm and 40°, giving an oil which was digested with ethyl acetate, filtered, and added slowly to petroleum ether to give the trifluoroacetate (1.35 g) of the title compound; this slat was suspended in water (100 ml.) and shaken with a 25 percent solution of LA—1(OAc⁻) in ether (30 ml.). More ether (30 ml.) was added and the two layers were separated by centrifuging. The aqueous phase was extracted three times more with ethyl acetate, and freeze-dried to give a white solid (650 mg.), which was washed with ether to give the title compound (485 mg), decomposed at 132° without melting, $[\alpha]_D^{24}$ + 31°(c 0.68 in water containing 12 drops dimethylsulphoxide per ml.), $\lambda_{max}$. (pH 6 phosphate buffer) 264 nm. ($\epsilon$8,100), $\nu_{max}$. (Nujol) 1785 ($\beta$-lactam) 1685, 1520 (amide), 1590 ($CO_2^\ominus$), and 692 cm.$^{-1}$ (Ph), N.M.R. (d$_6$-dimethylsulphoxide $\tau$H 2.6 (broad 5-proton singlet) (phenyl), 8.6 (multiplet) (S—CH$_2$CH$_2$—CH$_3$), 9.1 (3-proton triplet) (—S—CH$_2$—CH$_2$—CH$_3$) (Found: C, 51.5; H, 5.7; N. 9.0; S, 11.2. Calc. for C$_{19}$H$_{23}$NO$_4$S$_2$, C, 54.1; H, 5.5; N, 9.97; S, 15.2 percent). This substance moved to the cathode on electrophoresis at pH 1.9 (one spot only under ultraviolet light).

EXAMPLE 4

Preparation of 7$\beta$-(D-$\alpha$-Aminophenylacetamido)-3-Ethylthiomethylceph-3-Em-4-Carboxylic Acid The title compound was prepared via the following reaction scheme (the steps are described in more detail below).

3-acetoxymethyl-7$\beta$-(N-t-butoxycarbonyl-D-$\alpha$-aminophenylacetamido)-ceph-3-em-4-carboxylic acid ↓ (a)

7$\beta$-(N-t-butoxycarbonyl-D-$\alpha$-aminophenylacetamido)-3-ethylthiomethylceph-3-em-4-carboxylic acid ↓ (b)

7$\beta$-(D-$\alpha$-aminophenylacetamido)-3-ethylthiomethylceph-3-em-4-carboxylic acid.

a. 7 $\beta$-(N-T-Butoxycarbonyl-D-$\alpha$-Aminophenylacetamido-3-Ethylthiomethylceph-3-Em-4-Carboxylic Acid 3-Acetoxymethyl-7$\beta$-(N-t-butoxycarbonyl-D-$\alpha$-aminophenylacetamido)ceph-3-em-4-carboxylic acid (2.11 g., 0.004 mole) (prepared as described in Example 2 (a)) was stirred in a solution of sodium bicarbonate (0.32 g., 0.004 mole) in water (20 ml.) for 15 min. A few crystals of bicarbonate were added to complete the dissolution, and the solution was treated with ethane thiol (0.74 g., 0.012 mole) in a sealed glass tube at 70° for 4 hr. The contents of the tube were transferred to an open vessel and stirred at 40° for 15 min. to allow the excess thiol to evaporate. The impure product was then recovered in the usual way as a sticky yellow foam (1.72 g.), which on trituration under petroleum ether (b.p. 40°-60°) afforded a pale yellow powder (1.20 g.), T.L.C. R$_F$ 0.55, impurity with R$_F$ 0.92, $\lambda_{max}$. (pH6 buffer) 262 nm. ($\epsilon$7,160). A portion (0.50 g.) of this powder was dissolved in acetone (1 ml.) and treated with dicyclohexylamine (0.13 ml.) in acetone (1 ml.). The dicyclohexylamine salt was precipitated by the addition of petroleum ether (b.p. 40°-60°; 5 ml.) and was collected by filtration as an off-white powder (0.40 g.). This was dissolved in ethyl acetate (20 ml.) and 0.5N-hydrochloric acid (20 ml.). The acidic material was recovered in the usual way giving 7$\beta$-(N-t-butoxycarbonyl-D-$\alpha$-aminophenylacetamido)-3-ethylthiomethylceph-3-em-4-carboxylic acid as a colorless powder (0.28 g.) m.p. 114°-119° (shrinks at 102°), T.L.C. R$_F$ 0.55, trace spot at R$_F$ 0.92, ]$\alpha$]$_D$ $^{20}$ — 7.7° (c 1.00, DMSO) $\lambda_{max}$. (pH6 buffer) 263 nm. ($\epsilon$7,980) $\nu_{max}$. (Nujol) 1778 ($\beta$-lactam), 1710 (CO$_2$R), 1680, 1515 (amide), 700 cm.$^{-1}$ (phenyl), $\tau$(CDCl$_3$) 1.16 (1-proton doublet, J 9 Hz.; CONH), 2.68 (5-proton singlet; phenyl protons), 4.00 (1-proton doublet, J 8 Hz.; CONHCH), 4.34 (1-proton double doublet, J 5.9 Hz.; C—7 H), 4.68 (1-proton doublet, J 8 Hz.; CONHCH), 5.09 (1-proton doublet, J 5 Hz.; C-6 H), 6.26, 6.54 [two 1-proton doublets (branches of a quartet), J 16 Hz.; C—2 H$_2$] 6.54 (2-proton singlet; C—3 CH$_2$), 7.51 (1-proton quartet, J 7 Hz.; SCH$_2$CH$_3$), 8.60 (9-proton singlet; t-Bu), 8.80 (3-proton triplet, J 7 Hz.; CH$_2$CH$_3$). [Found: C, 54.1; H, 6.0; N, 8.1; S, 11.7. C$_{23}$H$_{29}$N$_3$O$_6$S$_2$ (507.6) requires C, 54.4; H, 5.7; N, 8.3; S, 12.6 percent ].

b. 7$\beta$-(D-$\alpha$-Aminophenylacetamido)-3-Ethylthiomethylceph-3-Em-4-Carboxylic Acid 7$\beta$-(N-t-Butoxycarbonyl-D-$\alpha$-aminophenylacetamido)-3-ethylthiomethylceph-3-em-4-carboxylic acid (1.2 g.) was treated with hydrochloric acid in acetic acid, followed by treatment with LA—2 as in the previous example, giving 7$\beta$-(D-$\alpha$-aminophenylacetamido)-3-ethylthiomethylceph-3-em-4-carboxylic acid as a pale yellow powder (0.62 g.), m.p. indefinite, shrinks with decomp. at 190°, T.L.C. R$_F$ 0.35, $[\alpha]_D^{20}$ + 34.4° (c 0.90, DMSO), $\lambda_{max}$. (pH6 buffer) 263 nm. ($\epsilon$5,750), $\nu_{max}$. (Nujol) 1760 ($\beta$-lactam), 1960 (amide), 1600 (carboxylate), 690 cm.$^{-1}$ (phenyl), $\tau$(DMSO-d 6 with D$_2$O) 2.46 (5-proton singlet; phenyl protons), 4.30 (1-proton doublet, J 5 Hz.; C—7 H), 4.84 (1-proton singlet; CONHCH), 4.88 (1-proton doublet, J 5 Hz.; C—6 H), 6.1–6.7 (4-proton signal; C-2 H$_2$, C—3 CH$_2$), 7.50 (2-proton quartet, J 7 Hz.; SCH$_2$CH$_3$), 8.22 (3-proton triplet; J 7 Hz.; CH$_2$CH$_3$). The ultraviolet spectrum indicated a purity of ca. 80 percent. The residual 20 percent is thought to be inorganic material, because of an ash found after combustion, coupled with its non-appearance in the proton magnetic resonance spectrum.

EXAMPLE 5

Preparation of 7$\beta$-(D-$\alpha$-Aminophenylacetamido-3-N-Butylthiomethylceph-3-Em-4Carboxylic Acid The title compound was prepared via the following reaction scheme (the steps are described in more detail below).

Sodium 3-acetoxymethyl-7$\beta$-(N-t-butoxycarbonyl-D-$\alpha$-aminophenylacetamido)ceph-3-em-4-carboxylic acid.

↓ (a)

7$\beta$-(N-t-butoxycarbonyl-D-$\alpha$-aminophenylacetamido)-3-n-butylthiomethylceph-3-em-4-carboxylic acid ↓ (b)

7$\beta$-(D-$\alpha$-aminophenylacetamido)-3-n-butylthiomethylceph-3-em-4-carboxylic acid.

a. 7$\beta$-(N-T-Butoxycarbonyl-D-$\alpha$-Aminophenylacetamido)-3-N-butylthiomethylceph-3-Em-4-Carboxylic Acid The sodium salt of 3-acetoxymethyl-7$\beta$-(N-t-butoxy-carbonyl-D-$\alpha$-aminophenylacetamido)ceph-3-em-4-carboxylic acid (15.83 g., 0.03 mole) [prepared as described in Example 2(a)] in water (150 ml.) was treated with n-butane thiol (8.18 g., 0.09 mole) at 80° for 5 hr. to ensure completion of the nucleophilic displacement (monitored by T.L.C.). Extraction of the cooled reaction mixture with ethyl acetate (2 $\times$ 350 ml.) gave a brown gum (10.51 g.) which contained the desired product, contaminated with a relatively non-polar component and a trace of starting material. Adjustment of the pH of the aqueous phase to 1.5, followed by extraction with ethyl acetate gave a yellow foam (0.66 g.) which contained none of the required product. The brown gum (10.51 g.) was dissolved in acetone (60 ml.) and to this solution was added dicyclohexylamine (12 ml.). The solution was refrigerated overnight and the solid which separated was collected by filtration, washed with acetone (5 ml.) and ether (2 $\times$ 10 ml.), and dried, giving dicyclohexylammonium 7$\beta$-(N-t-butoxycarbonyl-D-$\alpha$-aminophenylacetamideo)-3-n-butylthiomethylceph-3-em-4-carboxylate as an off-white solid (1.46 g.), T.L.C. R$_F$ 0.75, $\lambda_{max}$. (EtOH) 265 nm. ($\epsilon$9,030), $\nu_{max}$. (CHBr$_3$) 1768 ($\beta$-lactam), 1570 cm.$^{-1}$ (carboxylate). [Found: C, 61.8; H. 7.7; N, 7.5; S, 8.7. C$_{37}$ H$_{56}$N$_4$O$_6$ S$_2$(717) requires C, 62.0; H, 7.9; N 7,8; S, 9.8 percent]. The corresponding acid was regenerated in the usual way, giving off-white material (0.97 g.), m.p. 87°–105, $[\alpha]_D^{20}$ +1.9° (c 1.00, dioxan) $\lambda_{max}$. (EtOH) 267 nm. ($\epsilon$7,720), $\nu_{max}$. (CHBr$_3$) 1760 ($\beta$-lactam), 1710 ( carboxylic acid), 1670, 1490 cm.$^{-1}$ (amide, $\tau$ (DMSO-d 6) (poorly resolved spectrum) 2.56 (phenylprotons, 4.28 (C—7 H), 4.60 (CONHCH), 4.90 (C—6 H), 6.3–6.5 (C—2 H$_2$, C—3 CH$_2$), 7.3–7.7 (SCH$_2$CH$_2$) 8.4–9.0 (SCH$_2$CH$_2$CH$_2$CH$_3$), 8.58 (t-Bu), 9.12 (CH$_2$CH$_3$) [Found: C, 55.4; H, 6.2; N, 7.3; S, 11.4. C$_{25}$ H$_{33}$N$_3$O$_6$S$_2$ (536) requires C, 56.0: H, 6.2; N, 7.8; S, 12.0 percent].

b. 7β-(D-α-Aminophenylacetamido)-3-N-Butylthiomethyl-ceph-3-Em-4-Carboxylic Acid 7β-(N-t-Butoxycarbonyl-D-α-aminophenylacetamido)-3-n-butylthiomethylceph-3-em-4-carboxylic acid (2.00 g.) was dissolved in trifluoracetic acid (10 ml.) and anisole (2 ml.). After 5 min. at room temperature the volatile materials were removed at 40°/1 mm., leaving a gum which was dissolved in ethyl acetate (20 ml.). The solvent was evaporated in vacuo, leaving a gum which was redissolved in ethyl acetate (20 ml.) and poured into petroleum ether (b.p. 40°-60°; 200 ml.). The precipitate was collected by filtration, washed with petroleum ether, and dried, giving the trifluoracetate of the product as a pale yellow powder (1.86 g.). This powder was dissolved with difficulty, in water (50 ml.) and a 20 percent v/v solution of Amberlite LA—1 (acetate form) in ethyl acetate (50 ml.). Severe troubles with emulsions were encountered. The aqueous layer was collected and combined with further aqueous extracts (3 × 50 ml) of the organic layer. The combined extract was washed with ether (4 × 50 ml.), rotary evaporated to expel residual ether, and freeze-dried, giving impure 7β-(Dα-aminophenylacetamidoe)-3-n-butylthiomethylceph-3-em-4-carboxylic acid as a fluffy colorless solid (0.42 g.), m.p. indefinite shrinks with decomp. at 155°, T.L.C. $R_F$ 0.43, trace spots at $R_F$ 0.58, 0.75, moves 2.5 cm. towards the cathode in electrophoresis at pH 1.9 (a bright blue fluorescent spot runs 3.1 cm. towards the cathode, $\lambda_{max.}$ (ethanol) 263 nm. (4,060), $\nu_{max.}$ (CHBr$_3$) 1760 (β-lactam), 1685, 1520 (amide), 1600 cm.$^{-1}$ (carboxylate), τ(DMSO-d 6(poorly resolved spectrum) 2.63 (phenyl protons), 8.4–9.3 (SCH$_2$CH$_2$CH$_2$CH$_3$).

EXAMPLE 6

Preparation of 7β-(D-α-Aminophenylacetamido)-3-Methylsulphinylmethylceph-3-Em-4-Carboxylic Acid The title compound was prepared via the following reaction scheme (the steps are described in more detail below).

7β-(N-t-butoxycarbonyl-D-α-aminophenylacetamido)-3-methylthiomethylceph-3-em-4-carboxylic acid ↓ (a)

7β-(N-t-butoxycarbonyl-D-α-aminophenylacetamido)-3-methyl-sulphinylmethylceph-3-em-4-carboxylic acid ↓ (b)

7β-(D-α-aminophenylacetamido)-3-methylsulphinylmethylceph-3-em-4-carboxylic acid.

a. 7β-(N-T-Butoxycarbonyl-D-α-Aminophenylacetamido)-3-Methylsulphinylaph-3-Em-4-Carboxylic Acid A solution of 7β-(N-t-butoxycarbonyl-D-α-aminophenylacetamido)-3-methylthiomethylceph-3-em-4-carboxylic acid (884 mg., 1.8 mmole) (prepared as described in Example 2(b)) in tetrahydrofuran (20 ml.) was reacted at 70° for 80 minutes with dibenzoyl peroxide (1.109 g. of 70 percent material, 1.8 equivalents). The reaction mixture was cooled, poured into ethyl acetate (60 ml.) and evaporated to about 5 ml. Scratching the inside walls of the flask with a spatula initiated crystallization (136 mg). The mother liquors were added dropwise to petroleum spirit giving a white powder (673 mg.) identical to the crystalline material on chromatography; $R_F$ 0.24 (System 1), 0.28 (System 3). Total yield was 809 mg (88 percent) m.p. 120°–130° (decomp) $\lambda_{max}$ (aqueous pH 6 phosphate 0.02M) 267 nm (ε 9,750), $\nu_{max}$ (nujol) 3300, 1790, 1700, 1692, 1664, 1020 cm$^{-1}$ , τ(D$_2$O with NaHCO$_3$) 5.72, 6.30 (2 proton double doublet J = 14Hz) 7.34 (3 proton singlet) (Found C, 50.3; H, 5.2; N, 8.1; S, 12.3. C$_{22}$H$_{27}$N$_3$O$_7$S$_2$· H$_2$O requires C, 50.1; H, 5.5; N, 8.0, S, 12.1)

b. 7β-(D-α-Aminophenylacetamido)-3-Methylsulphinyl-methylceph-3-Em-4-Carboxylic Acid A solution of 7β-(N-t-butoxycarbonyl-D-α-aminophenylacetamido)-3-methylsulphinylmethylceph-3-em-4-carboxylic acid (440 mg) was dissolved in anisole (0.5 ml) and trifluoroacetic acid (2 ml). After 4 minutes the solvents were evaporated at 2 torr and 40° and the product shaken with water (100 ml) and LA1(OAc$^\ominus$) (20 ml of a 20 percent w/v solution in ether). The aqueous phase was washed well with ethyl acetate and freeze-dried to give a solid (369 mg) which was washed with ether to give the title compound (274 mg), m.p. 140°–160° (decomp) $\lambda_{max}$ (pH 6 aqueous 0.02M phosphate) 267 nm ($\nu$ 5,700) $\nu_{max}$ 1770, 1680, 1600, 1020 cm$^{-1}$, τ (d$_6$ dimethyl sulphoxide) 2.63 and other broad absorptions (very poor spectrum possibly caused by residual LA1) (Found C, 50.8; H, 5.9; N, 9.0; S, 11.2. C$_{17}$H$_{19}$N$_3$O$_5$S$_2$ requires, C, 49.9; H, 4.7; N, 10.3; S, 15.6.) The sample probably contained water of hydration and residual LA1 $R_F$ 0.6 and fluorescent spot $R_F$ 0.1 (System 2). The sample moved to the cathode on electrophoresis at pH 1.9. No phenylglycine was detected by ninhydrin spray.

EXAMPLE 7

Alternative Preparation of 7β-(N-t-Butoxycarbonyl-D-α-Aminophenylacetamido)-3-Methylthiomethylceph-3-Em-4-Carboxylic Acid The title compound was prepared via the following reaction scheme (the steps are described in more detail below)

3-acetoxymethyl-7β-(D-5 -benzamido-5 -carboxypentanamido) ceph-3-em-4-carboxylic acid disodium salt ↓ (a)

7β-(D-5′-benzamido-5 -carboxypentanamido)-3-methylthiomethylceph-3-em-4-carboxylic acid ↓ (b)

7β-amino-3-methylthiomethylceph-3-em-4-carboxylic acid

↓ (c)

7β-(N-t-butoxycarbonyl-D-α-aminophenylacetamido)-3-methylthiomethylceph-3-em-4-carboxylic acid.

a. 7β-(D-5′-Benzmido-5′-Carboxypentanamido)-3-Methyl Thiomethylceph-3-Em-4-Carboxylic Acid 3-Acetoxymethyl-7β-(D-5′-benzamido-5′-carboxypentanamido) ceph-3-em-4-carboxylic acid disodium salt (5.63 g. 0.01 mole) in water (50 ml.) was treated with methanethiol (1.46 g., 0.03 mole) in a sealed glass tube at 70° for 3 hr. The impure acidic product, 7β-(D-5′-benzamido-5′-carboxypentanamido-3-methylthiomethylceph-3-em-4-carboxylic acid, was obtained as a colorless foam (3.14 g.), $R_F$ 0.09 and several minor spots (system 1) (3-acetoxymethyl-7β-(D-5′-benzamido-5′-carboxypentanamido) ceph-3-em-4-carboxylic acid has $R_F$ 0.02), $R_F$ 0.87 (system 2), $\nu_{max.}$ (Nujol) 1755 (β-lactam), 1720 (CO$_2$H), 1640, 1536 cm$^{-1}$ (CONH), τ(D$_2$O with NaHCO$_3$) 2.18, 2.44 (5-proton multiplet; aromatic protons), 4.44 (1-proton doublet, J5 Hz.; C—7 H), 4.93 (1-proton doublet, J 5 Hz.; C—6H), 5.56 (1-proton multiplet;

$$CH_2C\overset{\displaystyle CO_2H}{\underset{\displaystyle N}{H}}$$

6.27, 6.68 [two 1-proton doublets (branches of a quartet), J 17 Hz.; C—2 H$_2$], 7.58 (2-proton multiplet; CH$_2$CONH), 7.98 (3-proton singlet; SCH$_3$), 8.1 (4-proton multiplet; CH$_2$CH$_2$CHCONH), with further peaks due to ethyl acetate and other trace impurities.

b. 7β-Amino-3-Methylthiomethylceph-3-Em-4-Carboxylic Acid

7β-(5′-Benzamido-5′-carboxypentanamido)-3-methylthiomethylceph-3-em-4-carboxylic acid (2.90 g., 5.72 mmole) in methylene chloride (210 ml.) containing pyridine (3.45 ml., 42.9 mmole) was treated with trimethyl silychloride (5.34 ml., 45.3 mmole), and the solution stirred at 30° for 2 hr., then cooled to −12°. Pyridine (6.69 ml., 90 mmole), then phosphorus pentachloride (4.68 g., 22.6 mmole) in methylene chloride (44 ml.), were added, and the mixture stirred for 40 min. at −12°. Cold methanol (90 ml.) was carefully added, so that the temperature remained below −10° C. The solution was stirred at −10° for 30 min., removed from the cooling bath and stirred for 60 min., then poured into 50%-aqueous formic acid (12 ml.). The pH was adjusted to 2.0 with triethylamine, and the solution stirred for 45 min before the pH was adjusted to 3.5 with triethylamine. The mixture was refrigerated overnight, the precipitate filtered off, washed with water, methanol and ether, then dried, giving 7β-amino-3-methylthiomethylceph-3-em-4-carboxylic acid as a colorless powder (0.50 g.), m/p/ 260°–268° [α]$_D^{19}$ +64.1° (c 1.00, 3%-NaHCO$_3$), λ$_{max.}$ (pH 6 buffer) 267 nm. (ε 9.640).

c. β-(N-t-Butoxycarbonyl-Dα-Aminophenylacetamido)-3-Methylthiomethylceph-3-Em-4-Carboxylic Acid Triethylamine (4.04 g. 0.04 mole) was added to a solution of D-α-t-butoxycarbonylaminophenylaceticaid (10.04 g., 0.04 mole) and isobutylchloroformate (5.46 g., 0.04 mole) in tetrahydrofuran (160 ml.) at −10°. This mixture was stirred at −10° for 10 min., then added to a cold solution of 7β-amion-3-methythiomethylceph-3-em-4-carboxylic acid (10.40 g., 0.04 mole) and triethylamine (6.06 g., 0.06 mole) in tetrahydrofuran (80ml.) and water (80 ml.) and the mixture stirred for 3 hr. at room temperature. The tetrahydrofuran was evaporated, the residue diluted with water (100 ml.) and ethyl acetate (100 ml.), and the pH adjusted to 3.5. The precipitated 7β-amion-3-methylthiomethylceph--3-em-4-carboxylic acid (2.10 g.) was removed by filtration, the pH adjusted to 2.0, and the solution extracted with ethyl acetate (3 × 250 ml.). This extract was washed with water (2 × 250 ml.) and brine (250 ml), dried (magnesium sulphate) and the solvent evaporated, leaving a yellow foam, which was stirred under isopropylether (20 ml.) and petrol (b.p. 40°–60°; 20 ml.) for 2 hr., giving 7β-(N-t-butoxy-carbonyl--D-α-amionphenylacetamido)-3-methythiomethylceph-3-em-4-carboxylic acid as a pale yellow powder (3.84 g), R$_F$ 0.80 (system 1), TLC R$_F$ 0.51, λ$_{max.}$ (pH 6 bugger) 265 nm. (ε 7,800).

d. 7β-(D-α-Aminophenylacetamido)-3-Methylthiomethylceph-3-Em-4-Carboxylic Acid

This is then prepared from the compound of Example 7 (c) as in Example 2 (c).

EXAMPLE 8

7β-(D-α-Aminophenylacetamido)-3-methylthiomethylceph-3-em-4-carboxylic acid

Triethylamine (51 mg., 0.5 mmole) was added to a stirred suspension of 7β-amino-3-methylthiomethylceph-3-em-4-carboxylic acid (130 mg., 0.5 mmole) in water (20 ml.). The mixture was filtered to remove a trace of solid, and the filtrate freeze-dried to give triethyl-ammonium 7β-amino-3-methylthiomethylceph-3-em-4-carboxylate as a bright yellow powder (180 mg). This salt was dissolved in methylene chloride (20 ml.) and dimethylacetamide (5 ml.) at 0°, and to the stirred solution was added D-phenylglycylchloride hydrochloride (206 mg., 1.0 mmole) The mixture was stirred at 0° for 3 hr., then the solvents were evaporated. High-voltage electrophoresis (125 volts/cm.) on Whatman No. 1 paper revealed components corresponding to 7β-(D-α-aminophenylacetamido)-3-methyl-thiomethylceph--em-4-carboxylic acid (81 cm. in 1 hr., immediate purple color with ninhydrin) and D-phenylglycine (9.9 cm. in 1 hr., elongated spot, yellow-brown, then purple color with ninhydrin), with an unknown minor impurity (12.4 cm. in 1 hr. purple color with ninhydrin). The starting material moves 10.6 cm. in 1 hr., giving a red color with ninhydrin, and would be hidden by the D-phenyglycine spot.

EXAMPLE 9

Sodium 7β-(2', 2'-Dimethyl-5'-Oxo-4'-Phenyl-1'-Imidazolynyl -3-Methylthiomethylceph-3-Em-4-Carboxylate 7β-(D-α-Amionphenylacetamido)-3-methylthiomethylceph--3-em-4-carboxylic acid (5 g. 1.27 mmole) was suspended in acetone, and triethylamine in acetone (1 percent solution 100 ml) was added to keep the apparent pH at 7.0. After 24 hr. stirring the residual starting material was filtered off (1.2 g), and the filtrate treated with sodium 2-ethylhexanoate (20 ml. of 10%-solution in acetone) a pale-yellow gelatinous product precipitated and was filtered off (1.5 g., 26%). Chromatography on silica-gel plates using 5 percent acetic acid in acetone established that a new product, R$_F$ 0.6, had been formed. (The starting material had R$_F$ 0.2. Further material (1.8 g., 33%) was obtained by addition of ether (20 ml) and sodium 2-ethyl hexanoate (20 ml.). The product had these properties: ν$_{max.}$ 1759 (azetidinone), 1680 (CONH) and 1600 cm$^{-1}$ (CO$_2$)τ(D$_2$O) 2.58 (five protons; phenyl), 5.24 (one proton;

PhCH 4.82 (two protons; 6— and 7—H), 6.17 and 6.76 (two-proton quartet. J13 Hz; 3—CH$_2$—SMe), 6.38 and 6.68 (two-proton quartet; 2—CH$_2$), 7.82 and 8.50 (six protons; gem.-dimethyl), and 8.03 (three protons; —SCH$_3$).

EXAMPLE 10 a. DL-α-T-Butoxycarbonylamino--(2-thienyl)acetic acid

DL-α-Amino-α-(2-thienyl)acetic acid (3.14 g., 20 mmole) was added to a solution of sodium carbonate (6.3 60 mmole) in water (20 ml.). When it had dissolved t-butanol (30 ml.) was added. t-Butyl p-nitrophenylcarbonate (4.8 g. 20 mmole) was added and the mixture was refluxed for 30 minutes. More t-butyl p-nitrophenylcarbonate (2.4 g. 10 mmole) was added and after a further 30 minutes refluxing another portion (2.4 g. 10 mmole) was added. After the mixture had refluxed for 1 hour the t-butanol was removed in vacuo. Water was added, and after the mixture had been cooled to 0° the resulting yellow solid was filtered off. The filtrate was covered with isopropyl ether and its pH was adjusted to 5 by the addition of concentrated hydrochloric acid. The layers were separated and the aqueous layer was reextracted with isopropyl ether. The aqueous solution was adjusted to pH 1 with conc. hydrochloric acid whereupon it was extracted with ethyl acetate (3x). The dried (MgSO$_4$) solution was charcoaled and concentrated to give a foam (3.1 g.). This was dissolved in ether and filtered through a pad of acidic alumina. Most of the ether was removed and petroleum (60°–80°) was added to slight turbidity. Cooling to 0° afforded DL-α-t-butoxycarbonylamino-α-(2-thienylacetic acid as prisms (1.4 g.) m.p. 88°–90°.

b. Diphenylmethyl 7β-[DL-α-T-Butoxycarbonylamino-α- -(2-thienyl)acetamido]-3-methylthiomethylceph-3-em-4-carboxylate A solution of diphenylmethyl 7β-amino-3-methylthiomethylceph-3-em-4-carboxylate (0.290 g. 0.68 mmole) and dicyclohexylcarbodiimide (0.157 g. 0.75 mmole) in methylene chloride (10 ml.) was added to a solution of DL-α-t-butoxycarbonylamino-α-(2-thienyl)acetic acid (0.175 g. 0.68 mmole) in dimethylformamide (3ml) and the resulting solution was stirred at room temperature for 16 hours. Precipitated dicyclohexylurea was filtered off and the filtrate was concentrated to a syrup in vacuo. Ethyl acetate was added and more dicyclohexylurea was filtered off. The filtrate was washed successively with 2N-hydrochloric acid, sodium bicarbonate solution and water and dried (MgSO$_4$). Removal of the solvent in vacuo afforded a syrup which was dissolved in ether and filtered. Removal of the ether afforded the title compound as a pale yellow foam (0.45 g.) τ (CDCl$_3$, 100 MHz.) 8.19,8.20 (2 1.5-proton singlets, S-CH$_3$ in the two diastereoisomers) R$_f$ (benzene-ethyl acetate, 10-1) 0.33.

c. 7β-[DL-α-Amino-α-(2-Thienyl)Acetamido]-3-Methylthiomethyceph-3-Em-4-Carboxylic Acid Trifluoracetate Salt.

Diphenylmethyl 7β-[DL-α-t-butoxycarbonylamino-α-(2-thienyl)acetamido]-3-methylthiomethylceph-3-em-4-carboxylate (0.372 g. 0.56 mmole) was dissolved in trifluoroacetic acid (5 ml.) containing amisole (0.25 ml.). After the solution had stood for 10 minutes at room temperature the trifluoroacetic acid was evaporated off in vacuo. The residue was dissolved in ethyl acetate and extracted with water (4x). The combined aqueous extracts were washed with ethyl acetate and ether and lyophilized to give the title compound as an amorphous powder (0.230 g) λ$_{max}$ (0.1M-phosphate buffer at pH 6) 237 nm. (ε 11,900), λ$_{inflexion}$ 262 nm. (ε 8,550) τ (CD$_3$SOCD$_3$100 MH$_2$) 8.01, 8.03 (two 1.5-proton singlets, S—CH$_3$ in the two diastereoisomers). R$_f$ (n-Propanol-water, 7.3) 0.8.

EXAMPLE 11 a. α-t-Butoxycarbonylamino-α-(4-Methylphenyl)Acetic acid

A mixture of DL-α-amino-α-(4-methylphenyl)acetic acid (5.0 g., 30 mmole), sodium carbonate (8.35 g., 80 mmole) and t-butyl p-nitrophenyl carbonate (12.6g., 52 mmole) in t-butanol (40 ml.) and water (30 ml.) was heated under reflux for 4 hours and then cooled to 0°. The yellow precipitate was filtered off, washed with ether and water (50 ml. each) and the combined filtrate and washings extracted with ether (3 × 100 ml.) acidified to pH 5.0 with conc. hydrochloric acid and reextracted with ether (3 × 100 ml.). The aqueous solution was then acidified to pH 1.0 and again extracted with ether (3 × 100 ml.). The last extract was dried ($Na_2SO_4$) and concentrated to give an oil (3g.) which was crystallized from petroleumethyl acetate to give the title compound (1.8g.) m.p. 118°–121°.

b. Diphenylmethyl 7β-[DL-α-T-Butoxycarbonylamino- α-(4-Methylphenyl)Acetamido]-3-Methylthiomethylceph-3-Em-4-Carboxylate A solution of α-t-butoxycarbonyl-α-(4-methylphenyl) acetic acid (0.185 g., 0.70 mmole) in dimethylformamide (3 ml.) was added to a solution of diphenylmethyl 7β-amion-3-methylthiomethylceph-3-em-4-carboxylate (0.290 g., 0.68 mmole) and dicylcohexylcarbodiimide (0.157g., 0.75 mmole) in methylene chloride (10 ml.) and the mixture was stirred 15 hours at room temperature. Precipitated dicyclohexylurea was filtered off and the filtrate concentrated in vacuo. Ethyl acetate was added, residual dicyclohexylurea filtered off, and the filtrate was washed with 2N-hydrochloric acid, sodium bicarbonate solution, brine, dried ($Na_2SO_4$) and concentrated to give the title compound as a foam (0.28 g.) $\tau$($CDCl_3$, 100 MHz) 8.15, 8.17 (two 1.5-proton singlets, S—$CH_3$ in the two diastereoisomers), $R_f$ (benzene-ethyl acetate, 10-1) 0.4.

c. 7β-[DL-α-Amino-α-(4-Methylphenyl)Acetamido]-3-methylthiomethylceph-3-Em-4-Carboxylic Acid Trifluoroacetate Salt lyophilized Trifluoroacetic acid (5 ml.) was added dropwise at room temperature to a stirred mixture of diphenylmethyl 7β-[DL-α-T-Butoxycarbonylamino-α-(4-methylphenyl)acetamido]-3-methylthiomethylcepb-3-em-4-carboxylate (0.250 g., mmole) and anisole (0.25 g.). After 15 minutes the mixture was concentrated in vacuo, and the residue was partitioned between water and ethyl acetate (50 ml. each). The aqueous phase was separated, washed with ethyl acetate and ether and lyophilised to give the title compound as a granular solid (0.086 g.) $\lambda_{max}$ (0.1M-phosphate buffer at pH 6) 265 nm. ($\epsilon$ 9,000) $\tau$($CD_3SOCD$, 100 MHz.) 8.00, 8.02 (two 1.5-proton singlets, S—$CH_3$ in the two diastereoisomers). $R_f$ (n-propanol-water, 7.3) 0.9.

Biological results of the compounds prepared in the Examples are given in Table I below.

The dry ingredients (a), (b) and (c) were blended together and granulated with a 10 percent aqueous paste of (d). The granules were passed through a No. 12 mesh (B.S.) screen, dried to constant weight and sieved through a No. 16 mesh (B.S.) screen. The granules were then lubricated by blending in (e) and compressed at 400 mg. per tablet on suitable punches. The tablets may be coated if required, for instance with a readily soluble conventional film coating.

B. Capsule
7β-(D-α-Aminophenylacetamido)-3-methylthio-
  methylceph-3-em-4-carboxylic acid                    250 mg.
*Aerosil compositum                                     3 mg.

*A silicon dioxide/starch blend available from Bush, Beach and Gent of Marlon House, Lloyd's Avenue, London, E.C.3.

The dry powders were blended together homogeneously and distributed into well filled, hard-gelatin capsules, so that each contained 250 mg. of the active ingredient.

C. Veterinary Product—Intramammary preparation
7β(D-αAminophenylacetamido)-3-methylthio-
  methylceph-3-em-4-carboxylic acid (sterile)          100 mg.

Aluminum stearate (3% w/w) gel in liquid paraffin to make up to 3 g.

The gel base was prepared in a conventional manner by distributing the aluminum stearate in the oil and heating, with stirring, until gelling took place. The base was further heated under sealed conditions to effect sterilization and thereafter subjected to rapid cooling without stirring, to produce a thick gel. The active ingredient was incorporated into the required amount of base under aseptic conditions, suitable stirring and refining processes being used to ensure a homogeneous mix. The product was distributed into sterilized tubes with suitable applicator nozzles for intramammary use, so that a quantity of 3 g. could be extruded from each tube.

We claim:
1. A compound of the formula

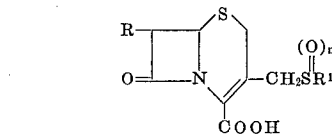

where R is (a) [Ar—CHCONH—]  Ar—CHCONH—
              |                    |
              X¹                   $NH_2$ in which Ar is thienyl, phenyl or phenyl substituted with halo, hydroxy, lower alkyl, nitro, amino, lower alkanoyl, lower alkoxy or lower alkylmercapto or (b)

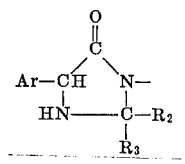

| | Tube dilution assay (γ/ml.) | | | | | | | | Mouse protection ($ED_{50}$/mg./ kg./dose) |
|---|---|---|---|---|---|---|---|---|---|
| | Gram positive | | | | Gram negative | | | | |
| Compound of Example Number | S. aureus 604 | S. aureus 663 | S. aureus 3452 | S. aureus 11127 | Strep. faecalis 850 | E. coli 573 | S. typhimurium 804 | Pr. mirabilis 431 | S. aureus subcutaneous 11127 | ROUR* |
| 1(f) | 1.25 | 0.6 | 4 | 4 | 16 | 8 | 8 | 62 | >50 | 32.5 |
| 3(d) | 2.5 | 0.6 | 1 | 31 | 31 | 62 | 31 | 250 | | 6.5 |
| 4(b) | 2.5 | 1.25 | 16 | 1 | 31 | 62 | 50 | 125 | | 4.0 |
| 5(b) | 1.25 | 1.25 | 16 | 8 | 125 | 125 | 250 | 250 | ~20 | 3.5 |
| 6(b) | >2.5 | >2.5 | 8 | 4 | 62 | 125 | 62 | 62 | >50 | 13.0 |

*ROUR = Percent recovery of the antibiotic from the urine of female rats following oral administration of the antibiotic.

PHARMACEUTICAL EXAMPLES

A. Tablet
a. 7β-(D-α-Aminophenylacetamido)-3-methylthio-
   methylceph-3-em-4-carboxylic acid                   250 mg.
b. Mannitol                                             75 mg.
c. Potato starch                                        46 mg.
d. Maize starch                                         25 mg.
e. Magnesium stearate                                    4 mg.

in which Ar has the meaning given above and $R^2$ and $R^3$ are $C_1$–$C_4$ alkyl; m is 0 or 1 and $R^1$ is lower alkyl; or a physiologically acceptable salt thereof.

2. A compound as defined in claim 1 wherein Ar is a phenyl -n-propylthiomethylceph--

3. A compound as defined in claim 1 in which R is a group (b) of the formula

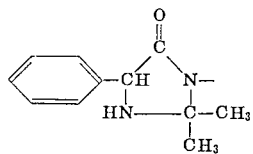

4. A compound as defined in claim 1 in which m is 0 and $R^1$ is methyl.

5. A compound as defined in claim 1 having the formula

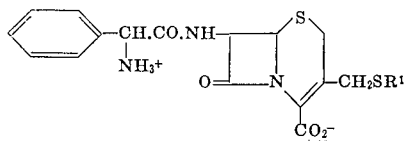

6. A compound as defined in claim 1 is 7β-(D-α-aminophenylacetamido)-3-methylthio-methyl-ceph-3-em-4-carboxylic acid.

7. A compound as defined in claim 1 7β-(D-α-aminophenylacetamido)-3-n-propylthiomethylceph--3-em-4-carboxylic acid.

8. A compound as defined in claim 1 which is 7β-(D-α-aminophenylacetamido)-3-ethylthiomethylceph-3-em-4-carboxylic acid.

9. A compound as defined in claim 1 which is 7β-(D-60α-amionphenylacetamido)3-n-butylthiomethylceph-3-em-4-carboxylic acid.

10. A compound as defined in claim 1 which is 7β-(D-α-aminophenylacetamido)-3-methylsulphinylmethylceph-3-em-4-carboxylic acid.

11. A compound as defined in claim 1 which is 7β-(2', 2'-dimethyl-5'-oxo-4'-phenyl-1'-imidazolidinyl)-3-methylthiomethylceph-3-em-4-carboxylic acid.

* * * * *

UNITED STATES PATENT OFFICE
CERTIFICATE OF CORRECTION

Patent No. 3,668,203  Dated June 6, 1972

Inventor(s) John Colin Clark, James Kennedy and Alan Gibson Long

It is certified that error appears in the above-identified patent and that said Letters Patent are hereby corrected as shown below:

Column 26, line 44, "[Ar-CHCONH-]" should be deleted.
$\quad\quad\quad\quad\quad\quad\quad\quad\quad\quad\quad\quad\ |$
$\quad\quad\quad\quad\quad\quad\quad\quad\quad\quad\quad\quad X^1$ Signed and sealed this 19th day of February 1974.

(SEAL)
Attest:

EDWARD M. FLETCHER, JR.
Attesting Officer

C. MARSHALL DANN
Commissioner of Patents